US012647898B2

(12) United States Patent
Wang et al.

(10) Patent No.: US 12,647,898 B2
(45) Date of Patent: Jun. 2, 2026

(54) CONTROL SIGNALING FOR REPEATERS WITH ENERGY TRANSFER

(71) Applicant: QUALCOMM Incorporated, San Diego, CA (US)

(72) Inventors: Xiaojie Wang, Hillsborough, NJ (US); Navid Abedini, Basking Ridge, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 786 days.

(21) Appl. No.: 17/859,635

(22) Filed: Jul. 7, 2022

(65) Prior Publication Data

US 2024/0015661 A1    Jan. 11, 2024

(51) Int. Cl.
*H04W 52/06*        (2009.01)
*H02J 50/50*        (2016.01)
(Continued)

(52) U.S. Cl.
CPC ........... *H04W 52/06* (2013.01); *H04L 5/0023* (2013.01); *H04L 5/0048* (2013.01); *H04W 48/16* (2013.01); *H04W 72/51* (2023.01)

(58) Field of Classification Search
CPC ..... H04W 52/06; H04W 48/16; H04W 72/51; H04W 52/281; H04W 52/346; H04W 40/22; H04W 52/46; H04W 88/04; H04L 5/0023; H04L 5/0048; H02J 50/50; H02J 50/80; H04B 7/15528
See application file for complete search history.

(56) References Cited

U.S. PATENT DOCUMENTS

| | | |
|---|---|---|
| 8,743,771 B2 | 6/2014 | Park et al. |
| 11,532,950 B2 * | 12/2022 | Shirsat .................... H02J 50/12 |

(Continued)

FOREIGN PATENT DOCUMENTS

| | | |
|---|---|---|
| CN | 1246689 A | 3/2000 |
| CN | 105610485 A | 5/2016 |
| WO | WO-2022067270 A1 | 3/2022 |

OTHER PUBLICATIONS

International Search Report and Written Opinion—PCT/US2023/025942—ISA/EPO—Oct. 12, 2023.

(Continued)

*Primary Examiner* — Charles N Appiah
(74) *Attorney, Agent, or Firm* — QUALCOMM Incorporated

(57) ABSTRACT

Methods, systems, and devices for wireless communications are described. Some wireless communications systems may support control signaling for repeaters with energy transfer. For example, a wireless node (e.g., a repeater) may receive control signaling including an indication of one or more configurations for relaying signals associated with multiple signal types between one or more transmitting nodes and one or more receiving nodes. In some cases, the multiple signal types may include a first signal type associated with an information communications signal and a second signal type associated with an energy transfer signal. Additionally, the wireless node may receive one or more signals of the first signal type, the second signal type, or both, and relay at least a subset of the one or more signals according to the one or more configurations.

30 Claims, 16 Drawing Sheets

(51) Int. Cl.
   *H04L 5/00*     (2006.01)
   *H04W 48/16*    (2009.01)
   *H04W 72/51*    (2023.01)

(56)           References Cited

U.S. PATENT DOCUMENTS

| | | | | |
|---|---|---|---|---|
| 2013/0288600 | A1* | 10/2013 | Kuusilinna | ............... H02J 7/42 |
| | | | | 455/41.2 |
| 2022/0174509 | A1 | 6/2022 | Noh et al. | |
| 2023/0022773 | A1* | 1/2023 | Leon Calvo | ......... H04W 40/00 |
| 2023/0112408 | A1* | 4/2023 | Rodriguez Bravo | ... H02J 50/50 |
| | | | | 320/108 |
| 2023/0363057 | A1* | 11/2023 | Ji | ......................... H04W 88/04 |

OTHER PUBLICATIONS

Zeng Y., et al., "Bidirectional Wireless Information and Power Transfer With a Helping Relay", IEEE Communications Letters, IEEE Service Center, Piscataway, NJ, US, vol. 20, No. 5, May 1, 2016, pp. 862-865, XP011611692, DOI: 10.1109/LCOMM.2016. 2549515, II. System Model, III. Power Splitting Based Protocol.

* cited by examiner

Figure 2:
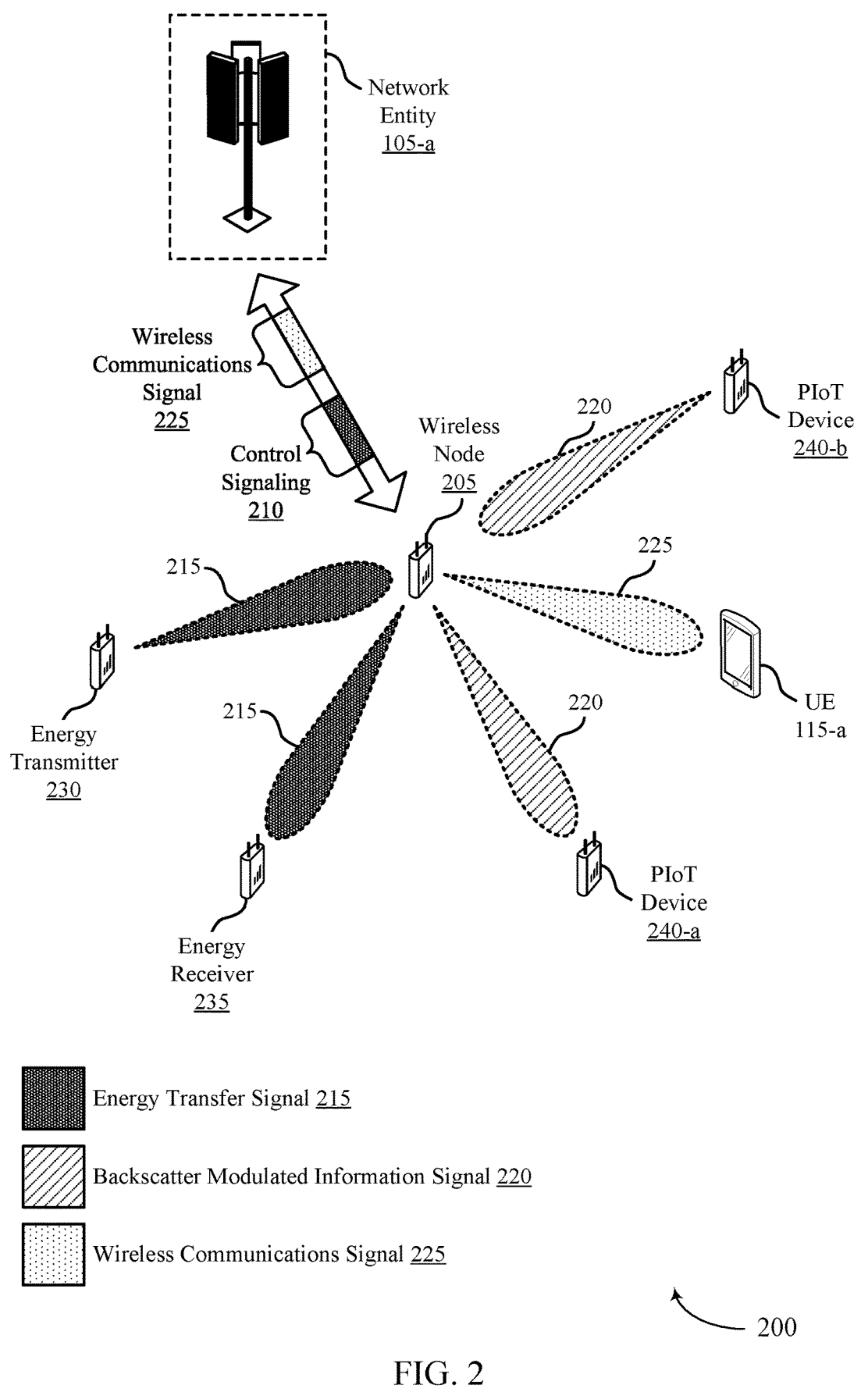

Network
Entity
105-a

Wireless
Communications
Signal
225

Control
Signaling
210

Wireless
Node
205

220

PIoT
Device
240-b

225

215

UE
115-a

215

220

Energy
Transmitter
230

PIoT
Device
240-a

Energy
Receiver
235

Energy Transfer Signal 215

Backscatter Modulated Information Signal 220

Wireless Communications Signal 225

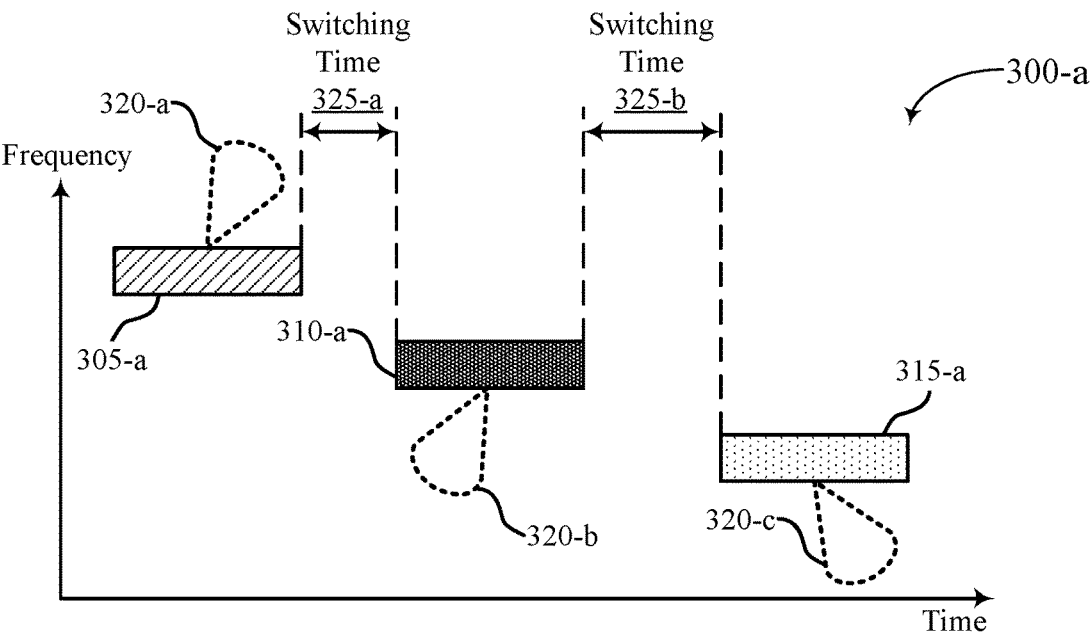
FIG. 3A
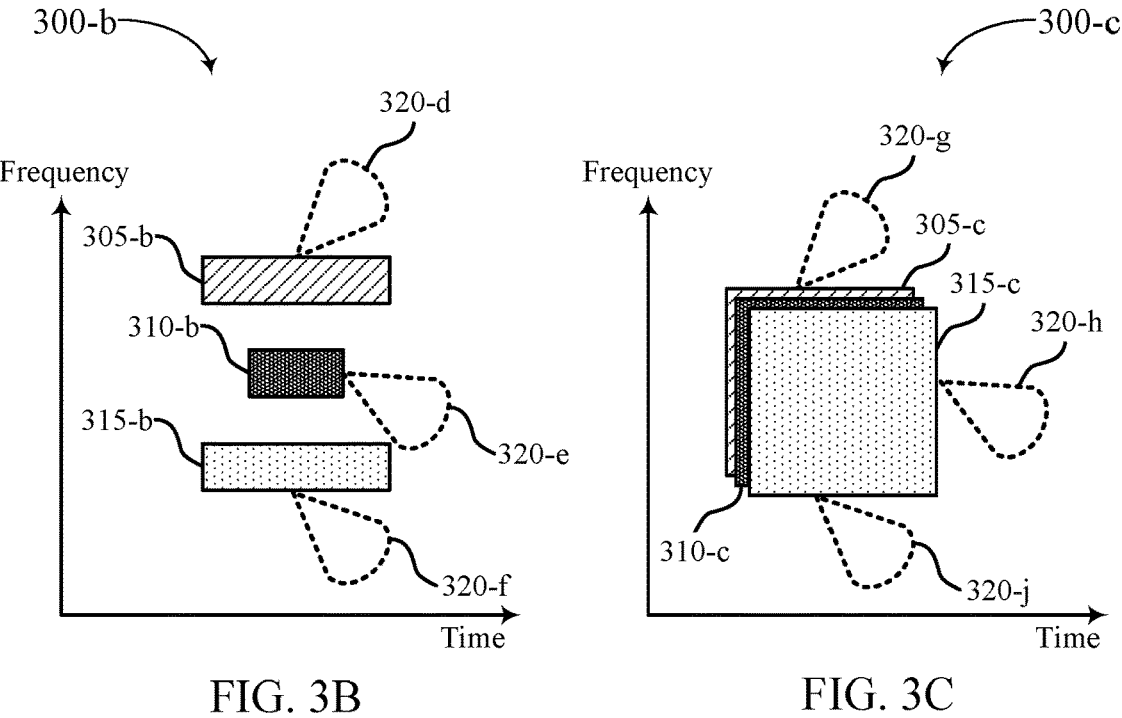
FIG. 3B          FIG. 3C
 Energy Transfer Signal 305
 Backscatter Modulated Information Signal 310
 Wireless Communications Signal 315

510

520

515

505

500

910

920

915

905

900

130     105     115

Network
Entity

Transceiver

1210

Antenna

1215

Communications
Manager

1220

Memory

Code

1230

1225

1240

Processor

1235

1205

1200

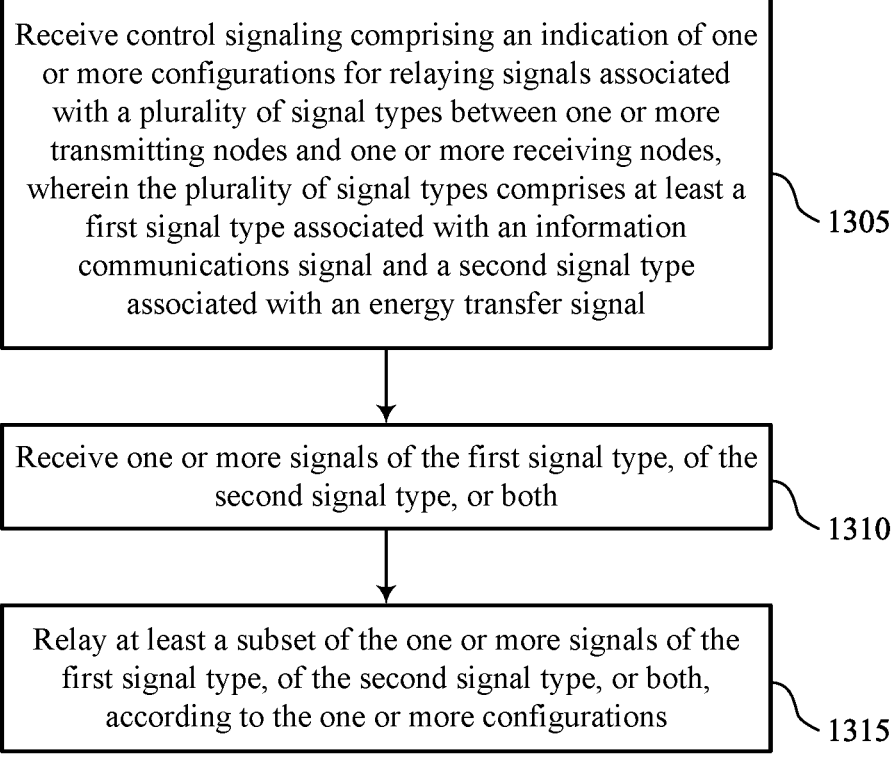

Receive control signaling comprising an indication of one or more configurations for relaying signals associated with a plurality of signal types between one or more transmitting nodes and one or more receiving nodes, wherein the plurality of signal types comprises at least a first signal type associated with an information communications signal and a second signal type associated with an energy transfer signal

1305

Receive one or more signals of the first signal type, of the second signal type, or both

1310

Relay at least a subset of the one or more signals of the first signal type, of the second signal type, or both, according to the one or more configurations

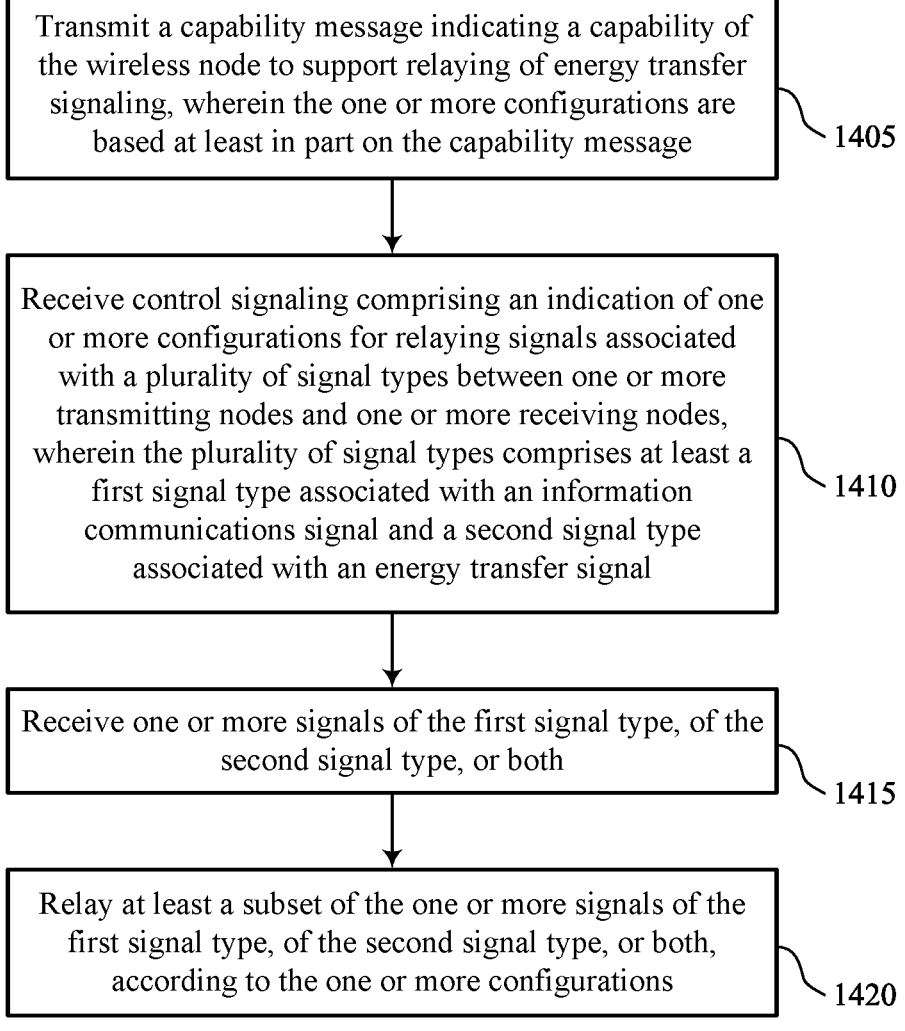

Transmit a capability message indicating a capability of the wireless node to support relaying of energy transfer signaling, wherein the one or more configurations are based at least in part on the capability message        1405

Receive control signaling comprising an indication of one or more configurations for relaying signals associated with a plurality of signal types between one or more transmitting nodes and one or more receiving nodes, wherein the plurality of signal types comprises at least a first signal type associated with an information communications signal and a second signal type associated with an energy transfer signal        1410

Receive one or more signals of the first signal type, of the second signal type, or both        1415

Relay at least a subset of the one or more signals of the first signal type, of the second signal type, or both, according to the one or more configurations        1420

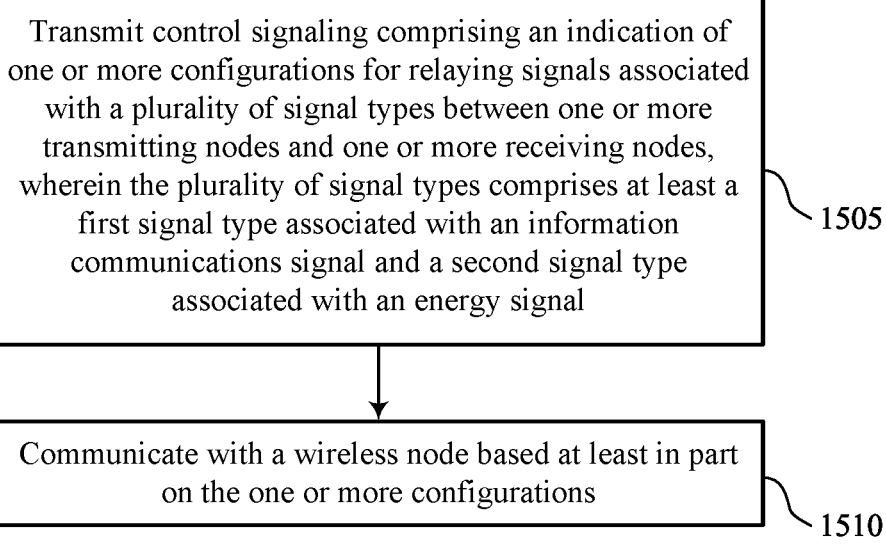

Transmit control signaling comprising an indication of one or more configurations for relaying signals associated with a plurality of signal types between one or more transmitting nodes and one or more receiving nodes, wherein the plurality of signal types comprises at least a first signal type associated with an information communications signal and a second signal type associated with an energy signal

1505

Communicate with a wireless node based at least in part on the one or more configurations

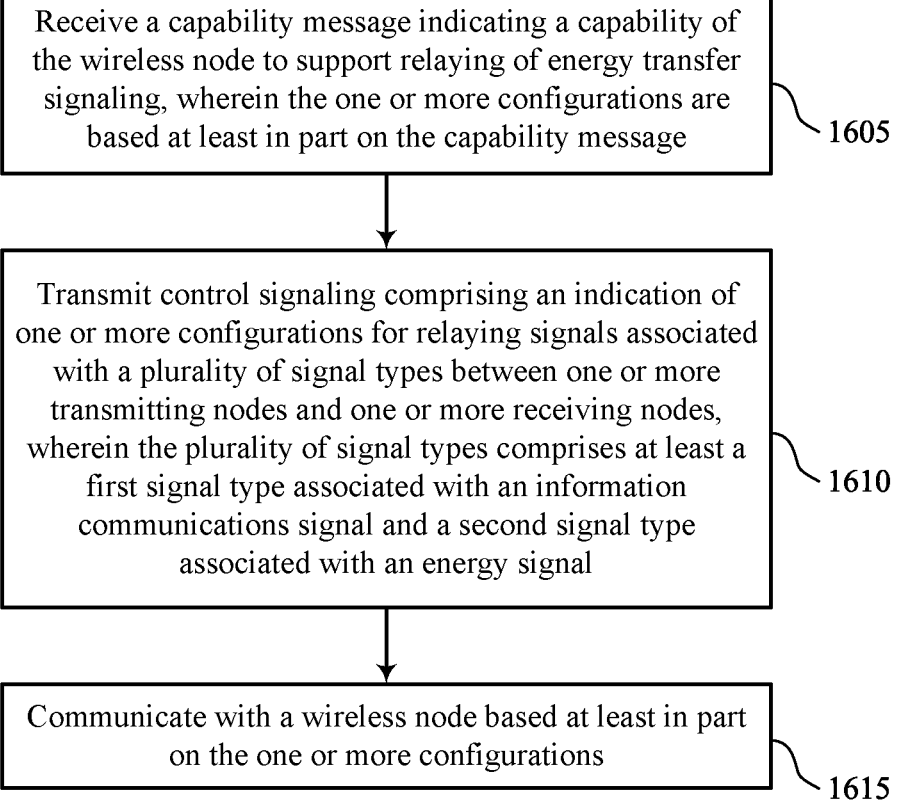

Receive a capability message indicating a capability of the wireless node to support relaying of energy transfer signaling, wherein the one or more configurations are based at least in part on the capability message

1605

Transmit control signaling comprising an indication of one or more configurations for relaying signals associated with a plurality of signal types between one or more transmitting nodes and one or more receiving nodes, wherein the plurality of signal types comprises at least a first signal type associated with an information communications signal and a second signal type associated with an energy signal

1610

Communicate with a wireless node based at least in part on the one or more configurations

CONTROL SIGNALING FOR REPEATERS WITH ENERGY TRANSFER

FIELD OF TECHNOLOGY

The following relates to wireless communications, including control signaling for repeaters with energy transfer.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support control signaling for repeaters with energy transfer. Generally, the techniques described herein enable a wireless node, such as a relay or a repeater, to relay signals associated with multiple signal types, including information communications signals (e.g., wireless communications signals, backscatter modulated information signals, or both) and energy transfer signals, according to one or more configurations. For example, a wireless node may receive, from a network entity, control signaling including an indication of one or more configurations for relaying signals associated with multiple signal types between one or more transmitting nodes and one or more receiving nodes. In some cases, the multiple signal types may include a first signal type associated with an information communications signal and a second signal type associated with an energy transfer signal. Additionally, the wireless node may receive one or more signals of the first signal type, the second signal type, or both, and may relay at least a subset of the one or more signals according to the one or more configurations.

In some cases, the one or more configurations may include one or more transmission parameters for relaying the one or more signals of the first signal type, the second signal type, or both. For example, the one or more transmission parameters may include one or more beam indices associated with each signal type, one or more transmit powers associated with each signal type, one or more sets of time and frequency resources associated with each signal type, a set priority values associated with each signal type, or any combination thereof. Additionally, or alternatively, the one or more configurations may include one or more transmit power priority rules, a transmission priority rule, or both, associated with the set of priority values.

A method for wireless communications at a wireless node is described. The method may include receiving control signaling including an indication of one or more configurations for relaying signals associated with a set of multiple signal types between one or more transmitting nodes and one or more receiving nodes, where the set of multiple signal types includes at least a first signal type associated with an information communications signal and a second signal type associated with an energy transfer signal, receiving one or more signals of the first signal type, of the second signal type, or both, and relaying at least a subset of the one or more signals of the first signal type, of the second signal type, or both, according to the one or more configurations.

An apparatus for wireless communications at a wireless node is described. The apparatus may include a processor, memory coupled with the processor, and instructions stored in the memory. The instructions may be executable by the processor to cause the apparatus to receive control signaling including an indication of one or more configurations for relaying signals associated with a set of multiple signal types between one or more transmitting nodes and one or more receiving nodes, where the set of multiple signal types includes at least a first signal type associated with an information communications signal and a second signal type associated with an energy transfer signal, receive one or more signals of the first signal type, of the second signal type, or both, and relay at least a subset of the one or more signals of the first signal type, of the second signal type, or both, according to the one or more configurations.

Another apparatus for wireless communications at a wireless node is described. The apparatus may include means for receiving control signaling including an indication of one or more configurations for relaying signals associated with a set of multiple signal types between one or more transmitting nodes and one or more receiving nodes, where the set of multiple signal types includes at least a first signal type associated with an information communications signal and a second signal type associated with an energy transfer signal, means for receiving one or more signals of the first signal type, of the second signal type, or both, and means for relaying at least a subset of the one or more signals of the first signal type, of the second signal type, or both, according to the one or more configurations.

A non-transitory computer-readable medium storing code for wireless communications at a wireless node is described. The code may include instructions executable by a processor to receive control signaling including an indication of one or more configurations for relaying signals associated with a set of multiple signal types between one or more transmitting nodes and one or more receiving nodes, where the set of multiple signal types includes at least a first signal type associated with an information communications signal and a second signal type associated with an energy transfer signal, receive one or more signals of the first signal type, of the second signal type, or both, and relay at least a subset of the one or more signals of the first signal type, of the second signal type, or both, according to the one or more configurations.

Some examples of the method, apparatuses, and non-transitory computer-readable medium described herein may further include operations, features, means, or instructions for transmitting a capability message indicating a capability of the wireless node to support relaying of energy transfer signaling, where the one or more configurations may be based on the capability message.

In some examples of the method, apparatuses, and non-transitory computer-readable medium described herein, receiving the control signaling may include operations, features, means, or instructions for receiving an indication of one or more transmission parameters for relaying the at least the subset of the one or more signals of the first signal type, of the second signal type, or both.

In some examples of the method, apparatuses, and non-transitory computer-readable medium described herein, receiving the indication of the one or more transmission parameters may include operations, features, means, or instructions for receiving an indication of one or more beam indices, where the one or more beam indices include at least a first beam index associated with the first signal type and a second beam index associated with the second signal type, and where the one or more transmission parameters includes the one or more beam indices.

In some examples of the method, apparatuses, and non-transitory computer-readable medium described herein, receiving the indication of the one or more transmission parameters may include operations, features, means, or instructions for receiving an indication of one or more transmit powers, where the one or more transmit powers includes at least a first transmit power associated with the first signal type and a second transmit power associated with the second signal type, and where the one or more transmission parameters include the one or more transmit powers.

In some examples of the method, apparatuses, and non-transitory computer-readable medium described herein, receiving the indication of the one or more transmission parameters may include operations, features, means, or instructions for receiving an indication of one or more sets of time and frequency resources, where the one or more sets of time and frequency resources includes at least a first set of time and frequency resources associated with the first signal type and a second set of time and frequency resources associated with the second signal type, and where the one or more transmission parameters include the one or more sets of time and frequency resources.

In some examples of the method, apparatuses, and non-transitory computer-readable medium described herein, the one or more configurations indicate a frequency division multiplexing configuration for transmitting the set of multiple signal types and a starting and length indicator value associated with the first set of time and frequency resources may be based on a starting and length indicator value associated with the second set of time and frequency resources.

In some examples of the method, apparatuses, and non-transitory computer-readable medium described herein, the one or more configurations indicate a time division multiplexing configuration for transmitting the set of multiple signal types, a duration between the first set of time and frequency resources and the second set of time and frequency resources satisfies a threshold duration, and the threshold duration may be based on a beam switching capability of the wireless node.

In some examples of the method, apparatuses, and non-transitory computer-readable medium described herein, receiving the indication of the one or more transmission parameters may include operations, features, means, or instructions for receiving a set of priority values associated with the set of multiple signal types, where the set of priority values includes at least a first priority value associated with the first signal type and a second priority value associated with the second signal type, and where the one or more transmission parameters includes the set of priority values.

In some examples of the method, apparatuses, and non-transitory computer-readable medium described herein, receiving the indication of the one or more configurations may include operations, features, means, or instructions for receiving an indication of one or more transmit power priority rules associated with the set of priority values, where the one or more configurations includes the one or more transmit power priority rules.

In some examples of the method, apparatuses, and non-transitory computer-readable medium described herein, a first transmit power priority rule of the one or more transmit power priority rules indicates for the wireless node to reduce a transmission power of one or more signals of a signal type associated with a lowest priority value out of the set of priority values associated with the set of multiple signal types.

In some examples of the method, apparatuses, and non-transitory computer-readable medium described herein, a first transmit power priority rule of the one or more transmit power priority rules indicates for the wireless node to reduce a transmission power of each signal of a set of signals and priority values associated each signal type of the set of signals may be equal.

In some examples of the method, apparatuses, and non-transitory computer-readable medium described herein, receiving the indication of the one or more configurations may include operations, features, means, or instructions for receiving an indication of a transmission priority rule associated with the set of priority values, where the transmission priority rule indicates for the wireless node to drop one or more signals of a signal type associated with a lowest priority value out of the set of priority values associated with the set of multiple signal types, and where the one or more configurations includes the transmission priority rule.

In some examples of the method, apparatuses, and non-transitory computer-readable medium described herein, the first signal type further includes a first information communications signal associated with wireless communications between a network entity and a UE and a second information communications signal associated with backscatter modulated information signaling from a passively powered device.

A method for wireless communications at a network entity is described. The method may include transmitting control signaling including an indication of one or more configurations for relaying signals associated with a set of multiple signal types between one or more transmitting nodes and one or more receiving nodes, where the set of multiple signal types includes at least a first signal type associated with an information communications signal and a second signal type associated with an energy signal and communicating with a wireless node based on the one or more configurations.

An apparatus for wireless communications at a network entity is described. The apparatus may include a processor, memory coupled with the processor, and instructions stored in the memory. The instructions may be executable by the processor to cause the apparatus to transmit control signaling including an indication of one or more configurations for relaying signals associated with a set of multiple signal types between one or more transmitting nodes and one or more receiving nodes, where the set of multiple signal types includes at least a first signal type associated with an information communications signal and a second signal type associated with an energy signal and communicate with a wireless node based on the one or more configurations.

Another apparatus for wireless communications at a network entity is described. The apparatus may include means for transmitting control signaling including an indication of one or more configurations for relaying signals associated with a set of multiple signal types between one or more transmitting nodes and one or more receiving nodes, where the set of multiple signal types includes at least a first signal type associated with an information communications signal and a second signal type associated with an energy signal and means for communicating with a wireless node based on the one or more configurations.

A non-transitory computer-readable medium storing code for wireless communications at a network entity is described. The code may include instructions executable by a processor to transmit control signaling including an indication of one or more configurations for relaying signals associated with a set of multiple signal types between one or more transmitting nodes and one or more receiving nodes, where the set of multiple signal types includes at least a first signal type associated with an information communications signal and a second signal type associated with an energy signal and communicate with a wireless node based on the one or more configurations.

Some examples of the method, apparatuses, and non-transitory computer-readable medium described herein may further include operations, features, means, or instructions for receiving a capability message indicating a capability of the wireless node to support relaying of energy transfer signaling, where the one or more configurations may be based on the capability message.

In some examples of the method, apparatuses, and non-transitory computer-readable medium described herein, transmitting the control signaling may include operations, features, means, or instructions for transmitting an indication of one or more transmission parameters for relaying the signals associated with the set of multiple signal types.

In some examples of the method, apparatuses, and non-transitory computer-readable medium described herein, transmitting the indication of the one or more transmission parameters may include operations, features, means, or instructions for transmitting an indication of one or more beam indices, where the one or more beam indices includes at least a first beam index associated with the first signal type and a second beam index associated with the second signal type, and where the one or more transmission parameters includes the one or more beam indices.

In some examples of the method, apparatuses, and non-transitory computer-readable medium described herein, transmitting the indication of the one or more transmission parameters may include operations, features, means, or instructions for transmitting an indication of one or more transmit powers, where the one or more transmit powers includes at least a first transmit power associated with the first signal type and a second transmit power associated with the second signal type and where the one or more transmission parameters includes the one or more transmit powers.

In some examples of the method, apparatuses, and non-transitory computer-readable medium described herein, transmitting the indication of the one or more transmission parameters may include operations, features, means, or instructions for transmitting an indication of one or more sets of time and frequency resources, where the one or more sets of time and frequency resources includes at least a first set of time and frequency resources associated with the first signal type and a second set of time and frequency resources associated with the second signal type, and where the one or more transmission parameters include the one or more sets of time and frequency resources.

In some examples of the method, apparatuses, and non-transitory computer-readable medium described herein, the one or more configurations indicate a frequency division multiplexing configuration for transmitting the set of multiple signal types and a starting and length indicator value associated with the first set of time and frequency resources may be based on a starting and length indicator value associated with the second set of time and frequency resources.

In some examples of the method, apparatuses, and non-transitory computer-readable medium described herein, the one or more configurations indicate a time division multiplexing configuration for transmitting the set of multiple signal types, a duration between the first set of time and frequency resources and the second set of time and frequency resources satisfies a threshold duration and, and the threshold duration may be based on a beam switching capability of the wireless node.

In some examples of the method, apparatuses, and non-transitory computer-readable medium described herein, transmitting the indication of the one or more transmission parameters may include operations, features, means, or instructions for transmitting a set of priority values associated with the set of multiple signal types, where the set of priority values includes at least a first priority value associated with the first signal type and a second priority value associated with the second signal type and where the one or more transmission parameters includes the set of priority values.

In some examples of the method, apparatuses, and non-transitory computer-readable medium described herein, transmitting the indication of the one or more configurations may include operations, features, means, or instructions for transmitting an indication of one or more transmit power priority rules associated with the set of priority values, where the one or more configurations includes the one or more transmit power priority rules.

In some examples of the method, apparatuses, and non-transitory computer-readable medium described herein, a first transmit power priority rule of the one or more transmit power priority rules indicates for the wireless node to reduce a transmission power of one or more signals of a signal type associated with a lowest priority value out of the set of priority values associated with the set of multiple signal types.

In some examples of the method, apparatuses, and non-transitory computer-readable medium described herein, a first transmit power priority rule of the one or more transmit power priority rules indicates for the wireless node to reduce a transmission power of each signal of a set of signals and priority values associated each signal type of the set of signals may be equal.

In some examples of the method, apparatuses, and non-transitory computer-readable medium described herein, receiving the indication of the one or more configurations may include operations, features, means, or instructions for transmitting an indication of a transmission priority rule associated with the set of priority values, where the transmission priority rule indicates for the wireless node to drop one or more signals of a signal type associated with a lowest priority value out of the set of priority values associated with the set of multiple signal types, and where the one or more configurations includes the transmission priority rule.

In some examples of the method, apparatuses, and non-transitory computer-readable medium described herein, the first signal type further includes a first information communications signal associated with wireless communications between the network entity and a UE and a second information communications signal associated with backscatter modulated information signaling from a passively powered device.

BRIEF DESCRIPTION OF THE DRAWINGS

FIG. 2 illustrates an example of a wireless communications system that supports control signaling for repeaters with energy transfer in accordance with one or more aspects of the present disclosure.

FIGS. 3A, 3B, and 3C each illustrate an example of a multiplexing communication scheme that supports control signaling for repeaters with energy transfer in accordance with one or more aspects of the present disclosure.

FIGS. 13 through 16 show flowcharts illustrating methods that support control signaling for repeaters with energy transfer in accordance with one or more aspects of the present disclosure.

DETAILED DESCRIPTION

Figure 1:
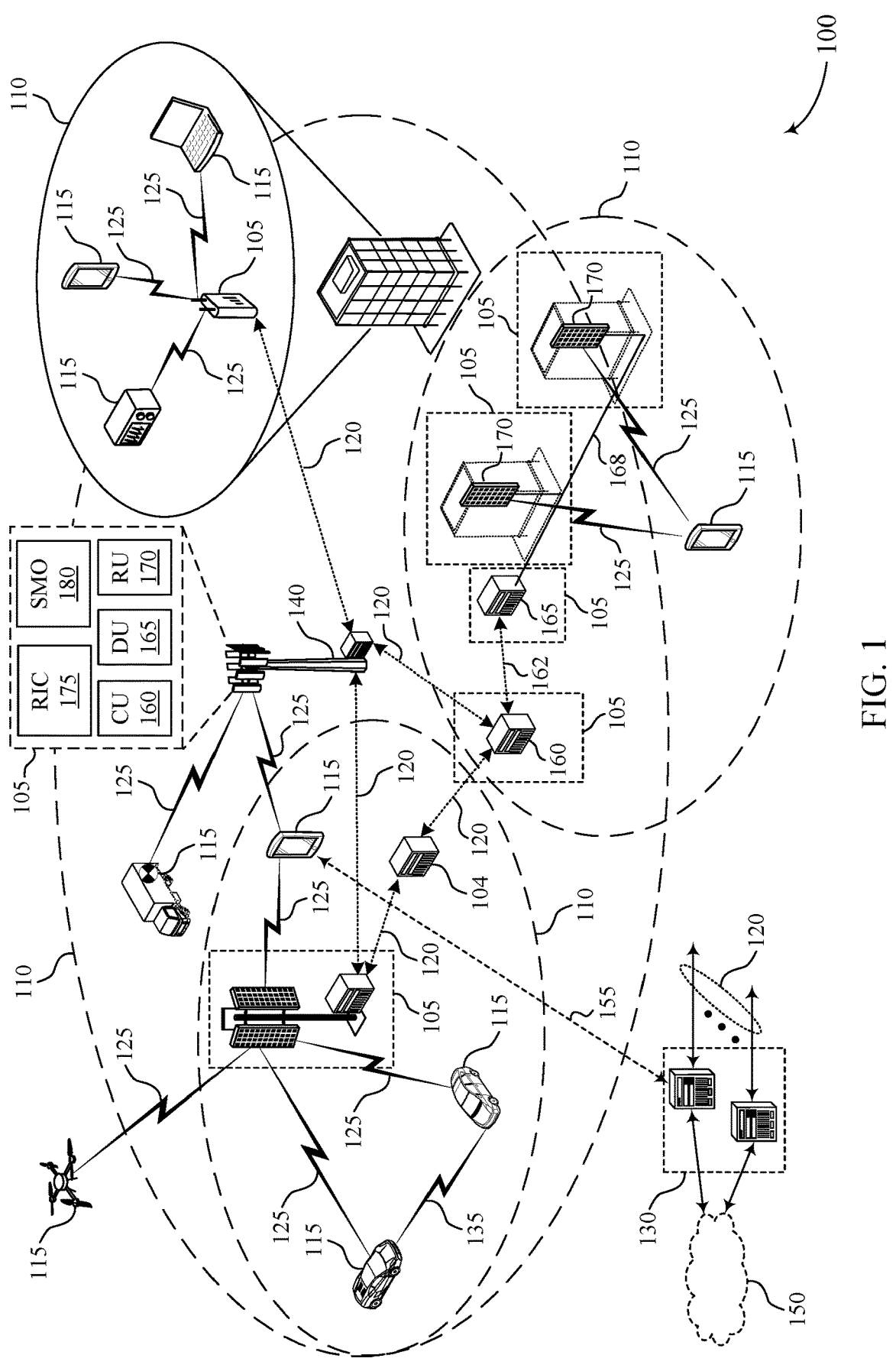
FIG. 1 illustrates an example of a wireless communications system that supports control signaling for repeaters with energy transfer in accordance with one or more aspects of the present disclosure.

Some wireless communications systems may support passive internet of things (PIoT) devices, such as radio frequency identification (RFID) tags. For example, a first wireless device, such as a network entity, may transmit an energy signal to a second wireless device, such as a PIoT device, and the PIoT device may reflect an information-bearing signal (e.g., a backscatter modulated information signal) back to the network entity, which the network entity may decode. However, PIoT devices may support a relatively short range (e.g., as compared to other transmission protocols) and reflections by multi-path communications may further reduce the range due to fading of the energy signal. As such, an assisting node (e.g., a smart repeater), which may also be referred to as a wireless node, may be used to direct an energy signal to a PIoT device, convey the information-bearing signaling from one PIoT device to another PIoT device, or both. However, current assisting node configurations may not support repeating energy signals in addition to information-carrying signals, such as backscatter modulated information signals (e.g., PIoT communication signals) or wireless communications signals (e.g., new radio (NR) signals or other similar wireless communications signals).

Techniques described herein may enable a wireless node, such as an assisting node, to relay signals associated with multiple signal types, including information-carrying signals, which may be referred to as information communications signals, and energy signals, which may be referred to as energy transfer signals. For example, a network entity may transmit control signaling configuring a wireless node to relay signals associated with multiple signal types, including at least a first signal type associated with an information communication signal and a second signal type associated with an energy transfer signal. In some cases, the configuration may indicate one or more transmission parameters including a beam index for each signal type, a transmit power for each signal type, time and frequency resources for each signal type, a priority value for each signal type, or any combination thereof. Additionally, or alternatively, the configuration may include one or more transmit power priority rules, one or more transmission priority rules, or both. For example, the wireless node may apply the one or more transmit power priority rules, the one or more transmission priority rules, or both, to a set of signals to be relayed by the wireless node when capabilities of the wireless node are exceeded based on the one or more transmission parameters associated with the set of signals.

Aspects of the disclosure are initially described in the context of wireless communications systems. Aspects of the disclosure are then described in the context of multiplexing communication schemes and a process flow. Aspects of the disclosure are further illustrated by and described with reference to apparatus diagrams, system diagrams, and flowcharts that relate to control signaling for repeaters with energy transfer.

FIG. 1 illustrates an example of a wireless communications system 100 that supports control signaling for repeaters with energy transfer in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support control signaling for repeaters with energy transfer as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE

115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s = 1/$ ($\Delta f_{max} \cdot N_f$) seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may support techniques to enable a wireless node, such as an assisting node or a UE 115, to relay signals associated with multiple signal types, including information communications signals and energy transfer signals. For example, a network entity 105 may transmit control signaling configuring a wireless node to relay signals associated with multiple signal types, including at least a first signal type associated with an information communication signal and a second signal type associated with an energy transfer signal. In some cases, the configuration may indicate one or more transmission parameters including a beam index for each signal type, a transmit power for each signal type, time and frequency resources for each signal type, a priority value for each signal type, or any combination thereof. Additionally, or alternatively, the configuration may include one or more transmit power priority rules, one or more transmission priority rules, or both. For example, the wireless node may apply the one or more transmit power priority rules, the one or more transmission priority rules, or both, to a set of signals to be relayed by the wireless node when capabilities of the wireless node are exceeded based on the one or more transmission parameters associated with the set of signals.

FIG. 2 illustrates an example of a wireless communications system 200 that supports control signaling for repeaters with energy transfer in accordance with one or more aspects of the present disclosure. In some examples, the wireless communications system 200 may implement or be implemented by aspects of the wireless communications system 100. For example, the wireless communications systems 200 may include one or more network entities 105 (e.g., a network entity 105-*a*) and one or more UEs 115 (e.g., a UE 115-*a*), which may be examples of the corresponding devices described with reference to FIG. 1. In the example of FIG. 2, the network entity 105-*a* may be examples of a CU 160, a DU 165, an RU 170, a base station 140, an IAB node 104, or one or more other network nodes as described with reference to FIG. 1. In some cases, the network entity 105-*a* may transmit, to a wireless node 205, control signaling 210 configuring the node 205 to relay signals associated with multiple signal types, including energy transfer signals 215, backscatter modulated information signal 220, and wireless communications signals 225.

Some wireless communications systems may support transmission of energy signaling (e.g., energy transfer signals 215), such as for PIoT devices, such as a PIoT device 240, including RFID tags among other use cases. For example, an RFID tag (e.g., RFID micro transponders) may receive an energy transfer signal 215 and emit an information-bearing signal, which may be referred to as an information communications signal or a backscatter modulated information signal 220, based on receiving the energy transfer signal 215. That is, the RFID tag (e.g., passive RFID) may harvest the energy transfer signal 215 over the air and power transmission/reception circuitry to emit the backscatter modulated information signal 220 (e.g., may operate without battery at low operating expenditure, low maintenance cost, and long-life cycle). In some cases, the RFID may be a semi-passive RFID or an active-RFID (e.g., with a battery).

Some wireless communications systems (e.g., 5th generation and 6th generation) may support PIoT devices 240 via capabilities of a network entity 105. For example, a network entity 105 may read and write information stored on PIoT device 240, provide energy to PIoT devices 240, receive an information-bearing signal reflected by PIoT devices 240, read information-bearing signals reflected by PIoT devices 240 to decode the information transmitted by the PIoT devices 240, or any combination thereof. However, PIoT devices 240, such as RFID tags, may support a short range (e.g., less than 10 m) due to insufficient link budgets (e.g., power link issues) and reflections by multi-path communications may result in fading to the energy transfer signal 215. For example, power harvesting circuitry may support high input powers (e.g., −13 decibel-milliwatts (dBm)) and lower input power (e.g., −20 dBm or below), and may not support cost and conversion efficiency (e.g., below 1%).

In such cases, an assisting node (e.g., a smart repeater, radio frequency repeater, passive reflector, and the like), which may be referred to as a wireless node (e.g., a wireless node 205), be used to direct energy transfer signals 215 to PIoT devices 240, relay information-bearing signaling (e.g., backscatter modulated signals 220) from one PIoT device 240 to another, or both. However, current assisting node configurations may not support relaying (e.g., repeating) energy transfer signals 215 in addition to information-bearing signals, such as backscatter modulated information signals 220 or wireless communications signals 225.

Techniques described herein may support control signaling 210 indicating one or more configurations for a wireless node, such as a wireless node 205, to relay signals associated with multiple signal types, including energy transfer signals 215 and information-bearing signals (e.g., information communication signals), such as backscatter modulated information signals 220 (e.g., PIoT communications signals) and wireless communications signals 225 (e.g., NR communications signals). For example, a wireless node 205 may be an example of an assisting node (e.g., a smart repeater, radio frequency repeater, passive reflector, a reconfigurable intelligent surface (RIS), or an intelligent reflecting surface (IRS), among other device types). In some cases, the wireless node 205 may receive control information (e.g., control signaling 210) for efficient operations (e.g., TDD configurations, enabling/disabling configurations, spatial information). Additionally, use of the wireless node 205 for relaying signaling may improve (e.g., extend) coverage of wireless energy transfer, leverage infrastructure for both energy and data delivery, and improve signal-to-interference-plus-noise ratio (SINR) (e.g., particularly for millimeter wave (mmW) bands).

In some cases, the wireless node 205 may transmit, to a network entity 105-a, a capability message indicating a capability of the wireless node 205 to support energy transfer (e.g., transmission), energy reception, or both (e.g., energy harvesting capability). That is, the capability message may indicate the ability of the wireless node to relay energy transfer signals 215 (e.g., reducing a dependency on a dedicated energy source).

In some cases, the network entity 105-a may transmit, to the wireless node 205, control signaling 210 (e.g., downlink control information (DCI), MAC-control element (MAC-CE), or RRC signaling) indicating one or more configurations for relaying signals associated with multiple signal types between one or more transmitting nodes, such as the network entity 105-a, an energy transmitter 230, and a PIoT device 240-b, and one or more receiving nodes, such as an energy receiver 235, a PIoT device 240-a, and a UE 115-a. For example, a first configuration may be associated with a first signal type, a second configuration may be associated with a second signal type, and a third configuration may be associated with a third signal type. In some cases, the first signal type may be associated with energy transfer signals 215, the second signal type may be associated with backscatter modulated information signals 220, and the third signal type may be associated with wireless communications signals 225. Additionally, the network entity 105-a may transmit the one or more configurations in separate control signaling 210 (e.g., a control message for each of the one or more configurations) or in joint control signaling 210 (e.g., a control message including all of the one or more configurations) based on a capability of the wireless node 205 (e.g., indicated to the network entity 105-a).

In some cases, the control signaling 210 may including one or more transmission parameters (e.g., included in the one or more configurations). For example, the one or more transmission parameters may include one or more beam indices. That is, the network entity 105-a may configure a first beam index for reception of a first signal type and a second beam index for transmission of the first signal type. For example, the wireless node may receive energy transfer signals 215 via a first beam associated with a first beam index and transmit the energy transfer signals 215 via a second beam associated with a second beam index. As an illustrative example, the wireless node 205 may receive an energy transfer signal 215 from the energy transfer signal via the first beam associated with the first beam index and relay (e.g., transmit, reflect, or repeat) the energy transfer signal 215 to the energy receiver 235 via the second beam associated with the second beam index. Similarly, the wireless node may receive backscatter modulated information signals 220 via a third beam associated with a third beam index, transmit backscatter modulated information signals 220 via a fourth beam associated with a fourth beam index, receive wireless communications signals 225 via a fifth beam associated with a fifth beam index, and transmit wireless communications signals 225 via a sixth beam associated with a sixth beam index. In some cases, the quantity of beams associated with the beam indices may not exceed a capability of the wireless node 205 (e.g., included in the capability message transmitted to the network entity 105-a). For example, one or more of the first beam, the second beam, the third beam, the fourth beam, the fifth beam, and the sixth beam may be the same or different.

In some cases, the one or more transmission parameters may include one or more transmit powers. That is, the network entity 105-a may configure a first transmit power for transmitting energy transfer signals 215, a second transmit power for transmitting backscatter modulated information signals 220, and a third transmit power for transmitting wireless communications signals 225. In some cases, the network entity 105-a may indicate the one or more transmit powers in absolute or relative values. That is, the network entity 105-a may indicate a transmit power in dBm or increase/decrease power in dB with respect to a configured reference power (e.g., reference power may be determined by the wireless node 205 or the network entity 105-a based on path-loss, reference signal measurements, or both). In some cases, the sum of the transmit powers (e.g., the first transmit power, the second transmit power, and the third transmit power) may not exceed a capability of the wireless node (e.g., included in the capability message transmitted to the network entity 105-a).

In some cases, the one or more transmission parameters may include one or more time and frequency resources, as described with reference to FIGS. 3A, 3B, and 3C. That is, the network entity 105-a may configure a first starting and length indicator (SLIV) for energy transfer signals 215, a second SLIV for backscatter modulated information signals 220, and a third SLIV for wireless communications signals 225. Additionally, the network entity 105-a may configure (e.g., pre-configure) the wireless node 205 with a set of frequency resources for each signal type (e.g., for energy transfer signals 215, for backscatter modulated information signals 220, for wireless communications signals 225), such that each signal type is associated with a separate bandwidth part (BWP). Additionally, or alternatively, the one or more transmission parameters may include an indication to TDM, FDM, or spatial division multiplex (SDM) one or more signals to be relayed by the wireless node 205 (e.g., equally splitting all resources), as described with reference to FIGS. 3A, 3B, and 3C.

In some cases, the control signaling 210 may include an indication of a priority value associated with each signal type (e.g., a prioritization of signal types). For example, a first priority value may be associated with energy transfer signals 215, a second priority value may be associated with backscatter modulated information signals 220, and a third priority value may be associated with wireless communications signals 225. In some cases, the third priority value may be greater than the first priority value, and the first priority value may be greater than the second priority value.

Additionally, the control signaling 210 may include an indication of one or more transmit power priority rules based on the priority values. For example, the wireless node 205 may support signal multiplexing capabilities (e.g., limited multiplexing capabilities), transmit power capabilities (e.g., a total transmit power), and transmission/reception beam capabilities (e.g., a quantity of beams supported by the wireless node 205). In some cases, the wireless node 205 may not expect to receive scheduling of one or more signals beyond its capabilities. In some other cases, the wireless node 205 may receive scheduling of one or more signals beyond its capabilities and may apply a transmit power priority rule from the one or more transmit power priority rules based on the capabilities being exceeded. For example, the network entity 105-a may schedule the wireless node 205 to relay a set of signals of multiple signal types, where a sum of respective transmit powers for the set of signals exceeds a total transmit power capability of the wireless node 205. In such cases, the wireless node 205 may apply a transmit power priority rule of the one or more transmit power priority rules based on the capabilities being exceeded.

In some cases, a first transmit power priority rule may indicate for the wireless node 205 to reduce a transmit power of one or more signals of a signal type associated with a lowest priority value. For example, the wireless node 205 may be scheduled to relay an energy transfer signal 215, associated with a first transmit power (e.g., P1), to the energy receiver 235, and a backscatter modulated information signal 220, associated with a second transmit power (e.g., P2), to the PIoT device 240-a, where the combination of the first transmit power and the second transmit power may exceed the total transmit power capability of the wireless node 205 (e.g., Pmax). Additionally, the backscatter modulated information signal 220 may be associated with a priority value that is lower than a priority value associated with the energy transfer signal 215. As such, the wireless node 205 may reduce the second transmit power to a third transmit power (e.g., Pmax−P1), such that the wireless node 205 transmits the energy transfer signal 215 at the first transmit power (e.g., P1) and the backscatter modulated information signal 220 at the third transmit power (e.g., Pmax−P1). In another example, the wireless node 205 may be scheduled to relay the energy transfer signal 215, associated with the first transmit power (e.g., P1), the backscatter modulated information signal 220, associated with the second transmit power (e.g., P2), and a wireless communications signal 225, associated with a third transmit power (e.g., P3), where the combination of the first transmit power, the second transmit power, and the third transit power exceeds the total transmit power capability of the wireless node 205 (e.g., Pmax). Additionally, the wireless communications signal 225 may be associated with a priority value that is greater than a priority value associated with the backscatter modulated information signal 220 and a priority value associated with the energy transfer signal 215. As such, the wireless node 205 may reduce the first transmit power and the second transmit power such that the energy transfer signal 215 and the backscatter modulated information signal 220 are transmitted at a fourth transmit power (e.g., the wireless node 205 may equally split residual transmit power if they are of equal power). That is, the wireless node 205 may transmit the wireless communications signal 225 at the third transmit power (e.g., P3), the energy transfer signal 215 at the fourth transmit power (e.g., (Pmax−P3)/2), and the backscatter modulated information signal 220 at the fourth transmit power.

In some cases, a second transmit power priority rule may indicate for the wireless node 205 to reduce a transmit power of each signal of a set of signals to be relayed by the wireless node 205 based on respective priority values of each signal of the set of signals being the same (e.g., equal). For example, the wireless node 205 may be scheduled to relay an energy transfer signal 215, associated with a first transmit power, to the energy receiver 235 and to relay a backscatter modulated information signal 220, associated with a second transmit power, to the PIoT device 240-a, where the combination of the first transmit power and the second transmit power may exceed the total transmit power capability of the wireless node 205. Additionally, the backscatter modulated information signal 220 may be associated with a priority value that is equal to a priority value associated with the energy transfer signal 215. As such, the wireless node 205 may reduce the first transmit power to a third transmit power and the second transmit power to a fourth transmit power, such that the wireless node 205 transmits the energy transfer signal 215 at the third (e.g., reduced) transmit power and the backscatter modulated information signal 220 at the fourth (e.g., reduced) transmit power. In some cases, the wireless node 205 may reduce the first transmit power and the second transmit power by the same amount. In some other cases, the wireless node 205 may reduce the first transmit power and the second transmit power by different amounts (e.g., based on a configuration of the wireless node 205).

In some cases, the control signaling 210 may include an indication of a transmission priority rule, where the transmission priority rule is based on the priority values. In some cases, the transmission priority rule may indicate for the wireless node 205 to drop one or more signals associated with a lowest priority value. For example, the wireless node 205 may be scheduled to relay a wireless communications signal 225, associated with a first transmit power (e.g., P1), an energy transfer signal 215, associated with a second transmit power (e.g., P2), and a backscatter modulated information signal 220, associated with a third transmit power (e.g., P3), where the combination of the first transmit power, the second transmit power, and the third transmit power exceeds the total transmit power capability (e.g., Pmax) of the wireless node 205. Additionally, the wireless communications signal 225 may be associated with a first priority value, the energy transfer signal 215 may be associated with a second priority value, and the backscatter modulated information signal 220 may be associated with a third priority value, where the first priority value is greater than the second priority value which is greater than the third priority value (e.g., wireless communications signal 225>energy transfer signal 215>backscatter modulated information signal 220). In some cases, the wireless node 205 may drop the backscatter modulated information signal 220 based on the third priority value being a lowest priority value and based on a sum of the first transmit power (e.g., associated with the wireless communications signal 225) and the second transmit power (e.g., associated with the energy transfer signal 215) being less than the total transmit power capability of the wireless node 205 (e.g., P1+P2<Pmax). In some other cases, the wireless node 205 may drop the energy transfer signal 215 and the backscatter modulated information signal 220 based on the second priority value and the third priority value being less than the first priority value and based on the first transmit power (e.g., associated with the wireless communications signal 225) being less than the total transmit power capability of the wireless node 205 (e.g., P1<Pmax).

In another example, the wireless node 205 may be scheduled to relay a wireless communications signal 225 via a first beam, an energy transfer signal 215, via a second beam, and a backscatter modulated information signal 220 via third beam, where the first beam, the second beam, and the third beam are different (e.g., three beams total) and the wireless node 205 may be capable of supporting two beams. Additionally, the wireless communications signal 225 may be associated with a first priority value, the energy transfer signal 215 may be associated with a second priority value, and the backscatter modulated information signal 220 may be associated with a third priority value, where the first priority value is greater than the second priority value which is greater than the third priority value. In some cases, the wireless node 205 may drop the backscatter modulated information signal 220 based on the third priority value being a lowest priority value and based on the wireless node 205 supporting two beams (e.g., based on the wireless node 205 being scheduled to relay signals using three beams when the wireless node 205 is capable of supporting two).

FIGS. 3A, 3B, and 3C each illustrate an example of a multiplexing communication 300 that supports control signaling for repeaters with energy transfer in accordance with one or more aspects of the present disclosure. In some examples, the multiplexing communication schemes 300 (e.g., the multiplexing communication scheme 300-a, the multiplexing communication scheme 300-b, and the multiplexing communication scheme 300-c) may implement or be implemented by aspects of the wireless communications system 100 and the wireless communications systems 200. For example, the multiplexing communication schemes 300 may be implemented by a wireless node, which may be an example of a network entity 105, a UE 115, or the like thereof, as described with reference to FIG. 1. In some cases, a network entity 105 may transmit, to a wireless node 205, control signaling configuring the wireless node to relay signals associated with multiple signal types, including energy transfer signals 305, backscatter modulated information signal 310, and wireless communications signals 315.

In some cases, in the example of FIG. 3A, a network entity 105 may configure a wireless node to relay signals associated with multiple signal types, including energy transfer signals 305, backscatter modulated information signal 310, and wireless communications signals 315, using one or more TDM techniques. For example, the wireless node may transmit an energy transfer signal 305-a via a beam 320-a during a first duration (e.g., according to a first set of time resources), a backscatter modulated information signal 310-a via a beam 320-b during a second duration (e.g., according to a second set of time resources), and a wireless communications signal 315-a via a beam 320-c during a third duration (e.g., according to a third set of time resources), where the first duration, the second duration, and the third duration are unique (e.g., the first set of time resources, the second set of time resources, and the third set of time resources are different). In some cases, a switching time 325-a may exist between transmission of the energy transfer signal 305-a and the backscatter modulated information signal 310-a, and a switching time 325-b may exist between the backscatter modulated information signal 310-a and the wireless communication signal 315-a. In some cases, the switching time 325-a may be the same as the switching time 325-b. In some other cases, the switching time 325-a may be different than the switching time 325-b (e.g., switching times 325 may be different following transmission or reception of different signal types). Additionally, or alternatively, the switching times 325 may be based on a capability of the wireless node to re-tune hardware (e.g., RF hardware) between signal transmissions (e.g., change transmit power, beam 320, perform BWP/band switching). That is, the switching times 325 may satisfy (e.g., exceed) a threshold, where the threshold is based on the capability of the wireless node. In some cases, one or more of a first frequency associated with the energy transfer signal 305-a, a second frequency associated with the backscatter modulated information signal 310-a, and a third frequency associated with the wireless communications signal 315 may be the same or different. Additionally, or alternatively, one or more of the beam 320-a, the beam 320-b, and the beam 320-c may be the same or different.

In some cases, in the example of FIG. 3B, the network entity 105 may configure the wireless node to relay signals associated with multiple signal types, including energy transfer signals 305, backscatter modulated information signals 310, and wireless communications signals 315, using one or more FDM techniques. That is, the wireless node may transmit an energy transfer signal 305-b via a beam 320-d at a first frequency (e.g., according to a first set of frequency resources), a backscatter modulated information signal 310-*b* via a beam 320-*e* at a second frequency (e.g., according to a second set of frequency resources), and a wireless communications signal 315-*b* via a beam 320-*f* at a third frequency (e.g., according to a third set of frequency resources), where the first frequency, the second frequency, and the third frequency are unique (e.g., the first set of frequency resources, the second set of frequency resources, and the third set of frequency resources are different). Additionally, or alternatively, one or more of the beam 320-*d*, the beam 320-*e*, and the beam 320-*f* may be the same or different.

In some cases, respective SLIVs associated with each signal type may be the same or different based on one or more capabilities of the wireless node (e.g., hardware capabilities or maintaining phase continuity and tuning transmit power). For example, the energy transfer signal 305-*b* may be associated with a first SLIV, the backscatter modulated information signal 310-*b* may be associated with a second SLIV, and the wireless communications signal 315-*b* may be associated with a third SLIV. In some examples, the first SLIV, the second SLIV, and the third SLIV may be the same, such that respective starting positions and durations of the energy transfer signal 305-*b*, the backscatter modulated information signal 310-*b*, and the wireless communications signals 315-*b* may be the same. In some other examples, one or more of the first SLIV, the second SLIV, and the third SLIV may be different. For example, the third SLIV associated with the wireless communications signal 315-*b* may be confined within one or more of the first SLIV associated with the energy transfer signal 305-*b* or the second SLIV associated with the backscatter modulated information signal 310-*b*. That is, the wireless communications signal 315-*b* may overlap (e.g., completely) in the time domain with the energy transfer signal 305-*b*, the backscatter modulated information signal 310-*b*, or both (e.g., the wireless node may refrain from starting or ending a transmission of an energy transfer signal 305, a backscatter modulated information signal 310, or both during transmission of a wireless communications signal 315). In some other examples, the first SLIV, the second SLIV, and the third SLIV may be based on an RF associated with each signal type (e.g., the wireless node has separate RFs for each signal type, which may be indicated to the network entity in a capability report).

In some cases, in the example of FIG. 3C, the network entity 105 may configure the wireless node to relay signals associated with multiple signal types, including energy transfer signals 305, backscatter modulated information signals 310, and wireless communications signals 315, using one or more SDM techniques (e.g., in combination with the TDM techniques, the FDM techniques, or both). That is, the wireless node may transmit an energy transfer signal 305-*c* via a beam 320-*g*, a backscatter modulated information signal 310-*c* via a beam 320-*h*, and a wireless communications signal 315-*c* via a beam 320-*j*. Additionally, the wireless node may transmit the energy transfer signal 305-*c* via, the backscatter modulated information signal 310-*c*, and the wireless communications signal 315-*c* using a same set of time and frequency resources (e.g., on different spatial layers). Additionally, or alternatively, one or more of the beam 320-*g*, the beam 320-*h*, and the beam 320-*j* may be the same or different.

In some cases, the wireless node may relay (e.g., transmit or receive) two or more of an energy transfer signals 305, a backscatter modulated information signals 310, and a wireless communications signals 315 using a common beam (e.g., due to a capability of the wireless node to support two or more simultaneous beams). For example, in FIG. 3A, the beam 320-*a* may be the same as the beam 320-*b* which may be the same as the beam 320-*c* (e.g., a best beam towards each receiving node). In some cases, the wireless node may split available transmit power (e.g., based on wireless node capability) equally between the energy transfer signals 305-*a* relayed via the beam 320-*a*, the backscatter modulated information signals 310-*a* relayed via the beam 320-*b*, and the wireless communications signals 315-*a* relayed via the beam 320-*c*. In some other cases, the wireless node may split the available transmit power between the energy transfer signals 305-*a* relayed via the beam 320-*a*, the backscatter modulated information signals 310-*a* relayed via the beam 320-*b*, and the wireless communications signals 315-*a* relayed via the beam 320-*c* based on a configuration, as described with reference to FIG. 2. That is, a network entity 105 may configure the wireless node to relay one or more of an energy transfer signal 305, a backscatter modulated information signal 310, and a wireless communications signal 315 using a configured transmit power (e.g., the wireless node is configured to use more transmit power to one type of signal). For example, the network entity 105 may configure the wireless node with a power offset (e.g., static or dynamic) to be applied to one or more signal types (e.g., backscatter modulated information signals 310 or wireless communications signals 315).

In another example (e.g., in FIG. 3A), the beam 320-*a* and the beam 320-*b* may be the same (e.g., a broad beam) while the beam 320-*c* may be different. That is, a receiving node associated with the energy transfer signals 305-*a* may be in proximity of a receiving node associated with the backscatter modulated information signals 310-*a* such that the wireless node may transmit the energy transfer signals 305-*a* and the backscatter modulated information signals 310-*a* using the same beam (e.g., a broad beam or adjacent beams).

While much of the present disclosure is described in the context of a wireless node transmitting one or more signals associated with multiple signal types, including energy transfer signals 305, backscatter modulated information signals 310, and wireless communications signals 315, this is not to be regarded as a limitation of the present disclosure. Indeed, it is contemplated herein that the wireless node may transmit one or more signals associated with multiple signal types based on control signaling configuring the wireless node to relay signals associated with multiple signal type. In this regard, reception of one or more signals associated with multiple signal types may be considered with reference to the techniques described herein. Additionally, or alternatively, simultaneous reception and transmission of one or more signals associated with multiple signal types may be considered with reference to the techniques described herein.

Figure 4:
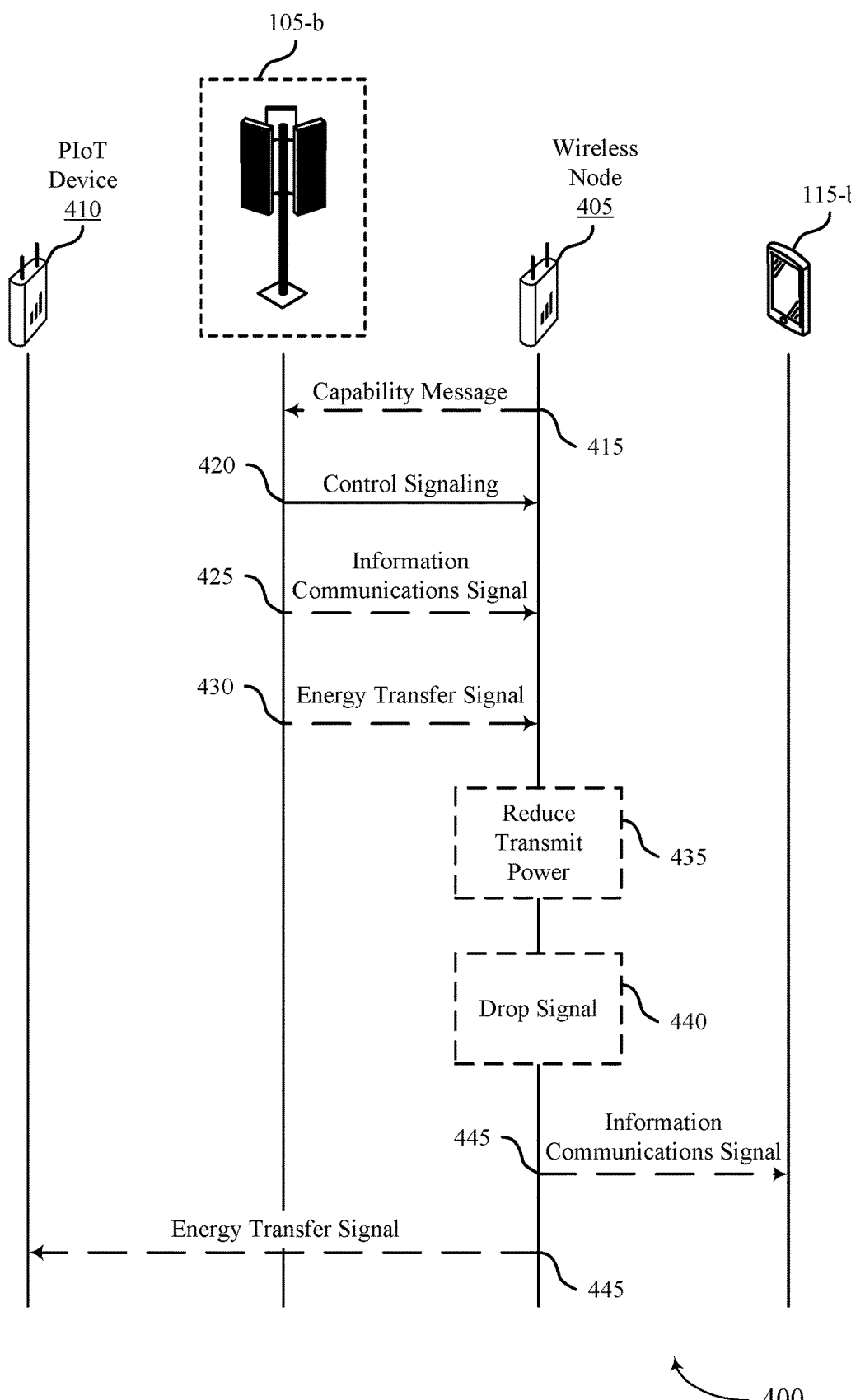
FIG. 4 illustrates an example of a process flow that supports control signaling for repeaters with energy transfer in accordance with one or more aspects of the present disclosure.

FIG. 4 illustrates an example of a process flow 400 that supports control signaling for repeaters with energy transfer in accordance with one or more aspects of the present disclosure. In some examples, the process flow 400 may implement or be implemented by aspects of the wireless communications system 100, the wireless communications systems 200, and the multiplexing communication schemes 300. For example, the process flow 400 may include one or more network entities 105 (e.g., a network entity 105-*b*) and one or more UEs 115 (e.g., a UE 115-*b*), which may be examples of the corresponding devices described with reference to FIG. 1. In the example of FIG. 4, the network entity 105-*b* may be examples of a CU 160, a DU 165, an RU 170, a base station 140, an IAB node 104, or one or more other network nodes as described with reference to FIG. 1. In some cases, the network entity 105-b may transmit control signaling to a wireless node 405 (e.g., an assisting node or a relay node) including an indication of one or more configurations for relaying signals associated with multiple signal types.

In some cases, at 415, the wireless node 405 may transmit, to the network entity 105-b, a capability message indicating a capability of the wireless node 405 to support relaying of energy transfer signaling.

At 420, the network entity 105-b may transmit, to the wireless node 405, control signaling including an indication of one or more configurations for relaying signals associated with a multiple of signal types between one or more transmitting nodes, such as a PIoT device 410 or the network entity 105-b, and one or more receiving nodes, such as a UE 115-b, wherein the multiple signal types includes at least a first signal type associated with an information communications signal and a second signal type associated with an energy transfer signal. In some cases, the first signal type may include a first information communications signal associated with wireless communications between the network entity 105-b and the UE 115-b and a second information communications signal associated with a backscatter modulated information signaling from a passively powered device, such as the PIoT device 410. In some cases, the network entity 105-b may transmit the control signaling based on receiving the capability message.

In some cases, the control signaling may include an indication of one or more transmission parameters (e.g., included in the one or more configurations) for relaying at least a subset of one or more signals of the first signal type, the second signal type, or both. For example, the one or more transmission parameters may include one or more beam indices, where the one or more beam indices include at least a first beam index associated with the first signal type and a second beam index associated with the second signal type. Additionally, or alternatively, the one or more transmission parameters may include one or more transmit powers, where the one or more transmit powers include at least a first transmit power associated with the first signal type and a second transmit power associated with the second signal type.

Additionally, or alternatively, the one or more transmission parameters may include one or more sets of time and frequency resources, where the one or more sets of time and frequency resources include at least a first set of time and frequency resources associated with the first signal type and a second set of time and frequency resources associated with the second signal type. In some cases, the one or more configurations may indicate an FDM configuration for transmitting the multiple signal types, and a SLIV associated with the first set of time and frequency resources may be based on a SLIV associated with the second set of time and frequency resources. In some other cases, the one or more configurations may indicate an TDM configuration for transmitting the multiple signal types, and a duration between the first set of time and frequency resources and the second set of time and frequency resources may satisfy a threshold duration, where the threshold duration is based at least in part on a beam switching capability of the wireless node 405.

Additionally, or alternatively, the one or more transmission parameters may include a set of priority values associated with the multiple signal types, where the set of priority values includes at least a first priority value associated with the first signal type and a second priority value associated with the second signal type. In some cases, the one or more configurations may include an indication of one or more transmit power priority rules associated with the set of priority values. For example, a first transmit power priority rule of the one or more transmit power priority rules may indicate for the wireless node 405 to reduce a transmission power of one or more signals of a signal type associated with a lowest priority value out of the set of priority values associated with the multiple signal types. In another example, a second transmit power priority rule of the one or more transmit power priority rules may indicate for the wireless node 405 to reduce a transmission power of each signal of a set of signals, wherein priority values associated each signal type of the set of signals are equal. Additionally, or alternatively, the one or more configurations may include an indication of a transmission priority rule associated with the set of priority values. For example, the transmission priority rule may indicate for the wireless node 405 to drop one or more signals of a signal type associated with a lowest priority value out of the set of priority values associated with the multiple of signal types.

In some case, the wireless node 405 may receive one or more signals of the first signal type, the second signal type, or both. For example, at 425, the network entity 105-b may transmit, to the wireless node 405, an information communications signal (e.g., associated with the first signal type) to be relayed to the UE 115-b and, at 430, the network entity 105-b may transmit, to the wireless node 405, an energy transfer signal (e.g., associated with the second signal type) to be relayed to the PIoT device 410. In some cases, the processes described at 425 and 430 may occur simultaneously. Additionally, the information communications signal may be associated with a first priority value based on the first signal type and the energy transfer signal may be associated with a second priority value based on the second signal type.

In some cases, at 435, transmission parameters associated with the information communications signal and transmission parameters associated with the energy transfer signal (e.g., based on the one or more configurations) may exceed the capabilities of the wireless node 405. For example, a combination of a transmit power associated with the information communications signal and a transmit power associated with the energy transfer signal may exceed a transmit power capability (e.g., maximum transmit power) of the wireless node 405. As such, the wireless node 405 may reduce the transmit power of the information communications signal, the energy transfer signal, or both based on the one or more transmit power rules indicated in the control signaling. For example, the first priority value associated with the information communications signal may be greater than the second priority value associated with the energy transfer signal, such that the wireless node 405 reduces the transmit power of the energy transfer signal. In another example, the first priority value associated with the information communications signal may be equal to the second priority value associated with the energy transfer signal, such that the wireless node 405 reduces the transmit power of both the information communications signal and the energy transfer signal.

In some cases, at 440, transmission parameters associated with the information communications signal and transmission parameters associated with the energy transfer signal (e.g., based on the one or more configurations) may exceed the capabilities of the wireless node 405 and the wireless node 405 may drop the information communications signal or the energy transfer signal based on the transmission priority rule indicated in the control signaling. For example, the first priority value associated with the information communications signal may be greater than the second priority value associated with the energy transfer signal, such that the wireless node 405 drops the energy transfer signal.

In some cases, the wireless node 405 may relay at least a subset of the one or more signals of the first signal type, the second signal type, or both, according to the one or more configurations. For example, at 445, the wireless node 405 may relay the information communications signal to the UE 115-*b* and, at 450, the wireless node may relay the energy transfer signal to the PIoT device 410. In some cases, the processes described at 445 and 450 may occur simultaneously.

Figure 5:
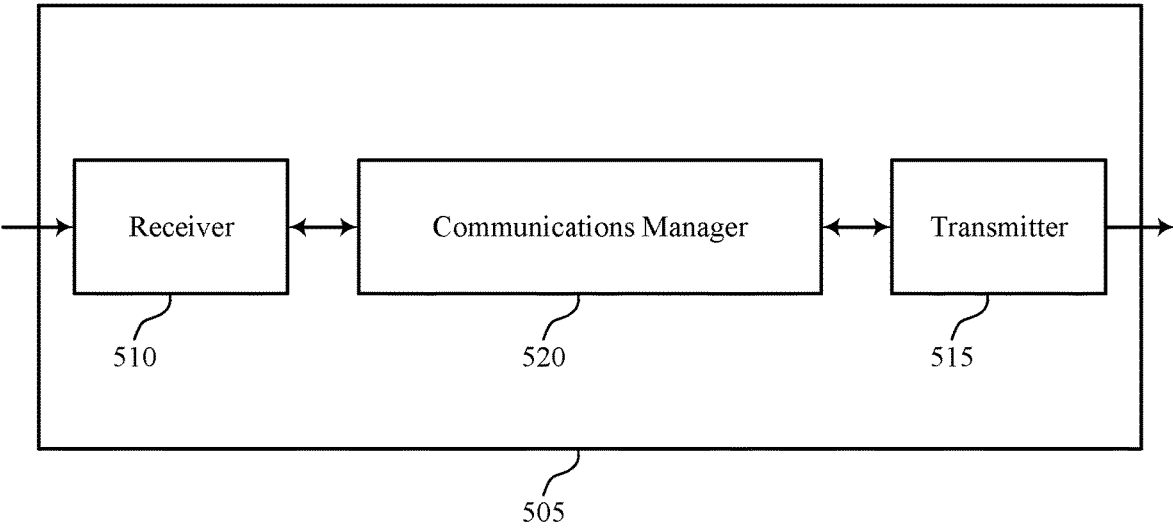
FIGS. 5 and 6 show block diagrams of devices that support control signaling for repeaters with energy transfer in accordance with one or more aspects of the present disclosure.

FIG. 5 shows a block diagram 500 of a device 505 that supports control signaling for repeaters with energy transfer in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to control signaling for repeaters with energy transfer). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to control signaling for repeaters with energy transfer). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of control signaling for repeaters with energy transfer as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a wireless node in accordance with examples as disclosed herein. For example, the communications manager 520 may be configured as or otherwise support a means for receiving control signaling including an indication of one or more configurations for relaying signals associated with a set of multiple signal types between one or more transmitting nodes and one or more receiving nodes, where the set of multiple signal types includes at least a first signal type associated with an information communications signal and a second signal type associated with an energy transfer signal. The communications manager 520 may be configured as or otherwise support a means for receiving one or more signals of the first signal type, of the second signal type, or both. The communications manager 520 may be configured as or otherwise support a means for relaying at least a subset of the one or more signals of the first signal type, of the second signal type, or both, according to the one or more configurations.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for relaying energy transfer signals which may result in reduced processing, reduced power consumption, and more efficient utilization of communication resources, among other advantages.

Figure 6:
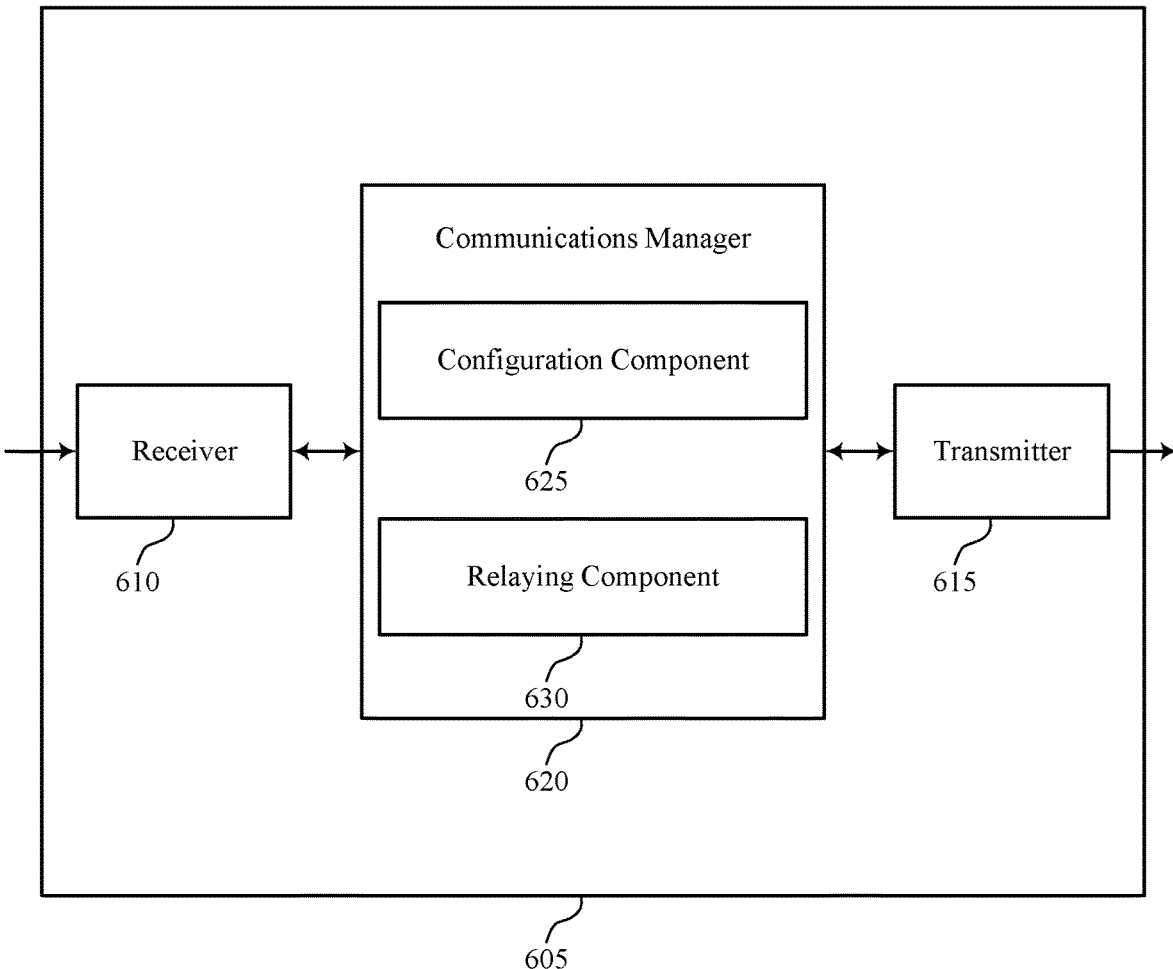
Figure 6:

FIG. 6 shows a block diagram 600 of a device 605 that supports control signaling for repeaters with energy transfer in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to control signaling for repeaters with energy transfer). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to control signaling for repeaters with energy transfer). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of control signaling for repeaters with energy transfer as described herein. For example, the communications manager 620 may include a configuration component 625 a relaying component 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a wireless node in accordance with examples as disclosed herein. The configuration component 625 may be configured as or otherwise support a means for receiving control signaling including an indication of one or more configurations for relaying signals associated with a set of multiple signal types between one or more transmitting nodes and one or more receiving nodes, where the set of multiple signal types includes at least a first signal type associated with an information communications signal and a second signal type associated with an energy transfer signal. The relaying component 630 may be configured as or otherwise support a means for receiving one or more signals of the first signal type, of the second signal type, or both. The relaying component 630 may be configured as or otherwise support a means for relaying at least a subset of the one or more signals of the first signal type, of the second signal type, or both, according to the one or more configurations.

Figure 7:
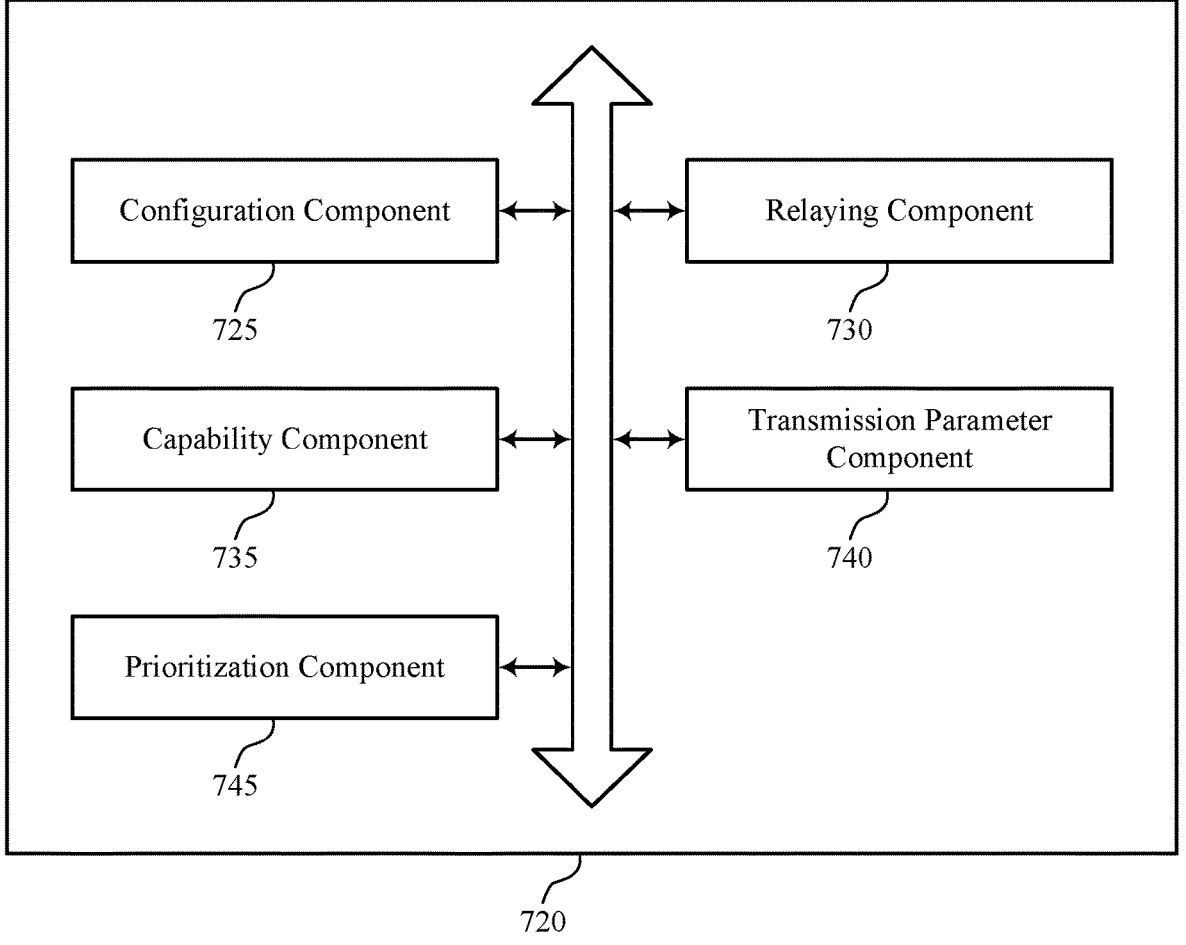
FIG. 7 shows a block diagram of a communications manager that supports control signaling for repeaters with energy transfer in accordance with one or more aspects of the present disclosure.

FIG. 7 shows a block diagram 700 of a communications manager 720 that supports control signaling for repeaters with energy transfer in accordance with one or more aspects of the present disclosure. The communications manager 720 may be an example of aspects of a communications manager 520, a communications manager 620, or both, as described herein. The communications manager 720, or various components thereof, may be an example of means for performing various aspects of control signaling for repeaters with energy transfer as described herein. For example, the communications manager 720 may include a configuration component 725, a relaying component 730, a capability component 735, a transmission parameter component 740, a prioritization component 745, or any combination thereof. Each of these components may communicate, directly or indirectly, with one another (e.g., via one or more buses).

The communications manager 720 may support wireless communications at a wireless node in accordance with examples as disclosed herein. The configuration component 725 may be configured as or otherwise support a means for receiving control signaling including an indication of one or more configurations for relaying signals associated with a set of multiple signal types between one or more transmitting nodes and one or more receiving nodes, where the set of multiple signal types includes at least a first signal type associated with an information communications signal and a second signal type associated with an energy transfer signal. The relaying component 730 may be configured as or otherwise support a means for receiving one or more signals of the first signal type, of the second signal type, or both. In some examples, the relaying component 730 may be configured as or otherwise support a means for relaying at least a subset of the one or more signals of the first signal type, of the second signal type, or both, according to the one or more configurations.

In some examples, the capability component 735 may be configured as or otherwise support a means for transmitting a capability message indicating a capability of the wireless node to support relaying of energy transfer signaling, where the one or more configurations are based on the capability message.

In some examples, to support receiving the control signaling, the transmission parameter component 740 may be configured as or otherwise support a means for receiving an indication of one or more transmission parameters for relaying the at least the subset of the one or more signals of the first signal type, of the second signal type, or both.

In some examples, to support receiving the indication of the one or more transmission parameters, the transmission parameter component 740 may be configured as or otherwise support a means for receiving an indication of one or more beam indices, where the one or more beam indices include at least a first beam index associated with the first signal type and a second beam index associated with the second signal type, and where the one or more transmission parameters includes the one or more beam indices.

In some examples, to support receiving the indication of the one or more transmission parameters, the transmission parameter component 740 may be configured as or otherwise support a means for receiving an indication of one or more transmit powers, where the one or more transmit powers includes at least a first transmit power associated with the first signal type and a second transmit power associated with the second signal type, and where the one or more transmission parameters include the one or more transmit powers.

In some examples, to support receiving the indication of the one or more transmission parameters, the transmission parameter component 740 may be configured as or otherwise support a means for receiving an indication of one or more sets of time and frequency resources, where the one or more sets of time and frequency resources includes at least a first set of time and frequency resources associated with the first signal type and a second set of time and frequency resources associated with the second signal type, and where the one or more transmission parameters include the one or more sets of time and frequency resources.

In some examples, the one or more configurations indicate a frequency division multiplexing configuration for transmitting the set of multiple signal types. In some examples, a starting and length indicator value associated with the first set of time and frequency resources is based on a starting and length indicator value associated with the second set of time and frequency resources.

In some examples, the one or more configurations indicate a time division multiplexing configuration for transmitting the set of multiple signal types. In some examples, a duration between the first set of time and frequency resources and the second set of time and frequency resources satisfies a threshold duration. In some examples, the threshold duration is based on a beam switching capability of the wireless node.

In some examples, to support receiving the indication of the one or more transmission parameters, the prioritization component 745 may be configured as or otherwise support a means for receiving a set of priority values associated with the set of multiple signal types, where the set of priority values includes at least a first priority value associated with the first signal type and a second priority value associated with the second signal type, and where the one or more transmission parameters includes the set of priority values.

In some examples, to support receiving the indication of the one or more configurations, the prioritization component 745 may be configured as or otherwise support a means for receiving an indication of one or more transmit power priority rules associated with the set of priority values, where the one or more configurations includes the one or more transmit power priority rules.

In some examples, a first transmit power priority rule of the one or more transmit power priority rules indicates for the wireless node to reduce a transmission power of one or more signals of a signal type associated with a lowest priority value out of the set of priority values associated with the set of multiple signal types.

In some examples, a first transmit power priority rule of the one or more transmit power priority rules indicates for the wireless node to reduce a transmission power of each signal of a set of signals. In some examples, priority values associated each signal type of the set of signals are equal.

In some examples, to support receiving the indication of the one or more configurations, the prioritization component 745 may be configured as or otherwise support a means for receiving an indication of a transmission priority rule associated with the set of priority values, where the transmission priority rule indicates for the wireless node to drop one or more signals of a signal type associated with a lowest priority value out of the set of priority values associated with the set of multiple signal types, and where the one or more configurations includes the transmission priority rule.

In some examples, the first signal type further includes a first information communications signal associated with wireless communications between a network entity and a UE and a second information communications signal associated with backscatter modulated information signaling from a passively powered device.

Figure 8:
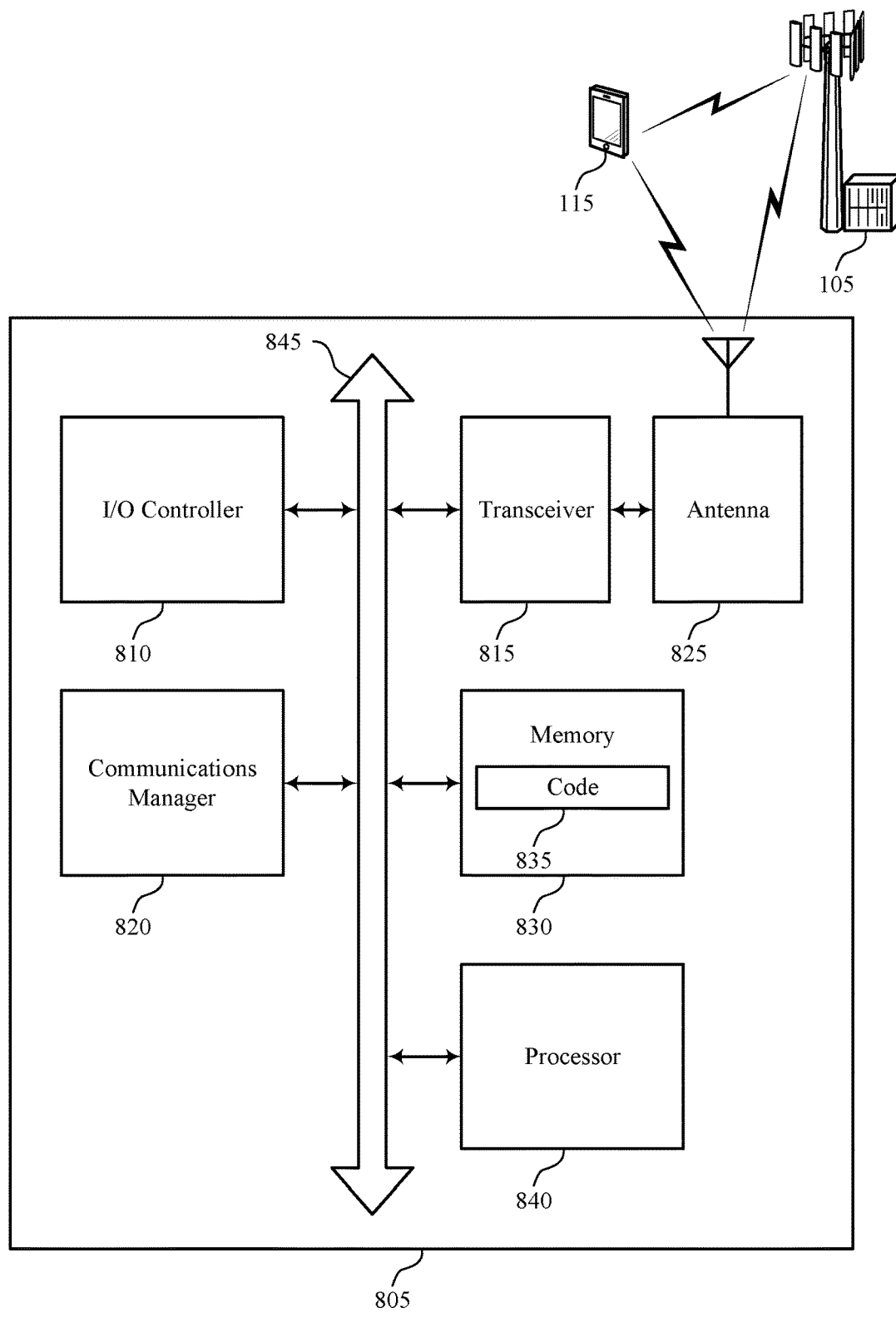
FIG. 8 shows a diagram of a system including a device that supports control signaling for repeaters with energy transfer in accordance with one or more aspects of the present disclosure.

FIG. 8 shows a diagram of a system 800 including a device 805 that supports control signaling for repeaters with energy transfer in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting control signaling for repeaters with energy transfer). For example, the device 805 or a component of the device 805 may include a processor 840 and memory 830 coupled with or to the processor 840, the processor 840 and memory 830 configured to perform various functions described herein.

The communications manager 820 may support wireless communications at a wireless node in accordance with examples as disclosed herein. For example, the communications manager 820 may be configured as or otherwise support a means for receiving control signaling including an indication of one or more configurations for relaying signals associated with a set of multiple signal types between one or more transmitting nodes and one or more receiving nodes, where the set of multiple signal types includes at least a first signal type associated with an information communications signal and a second signal type associated with an energy transfer signal. The communications manager 820 may be configured as or otherwise support a means for receiving one or more signals of the first signal type, of the second signal type, or both. The communications manager 820 may be configured as or otherwise support a means for relaying at least a subset of the one or more signals of the first signal type, of the second signal type, or both, according to the one or more configurations.

By including or configuring the communications manager 820 in accordance with examples as described herein, the device 805 may support techniques for relaying energy transfer signals which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of control signaling for repeaters with energy transfer as described herein, or the processor 840 and the memory 830 may be otherwise configured to perform or support such operations.

Figure 9:
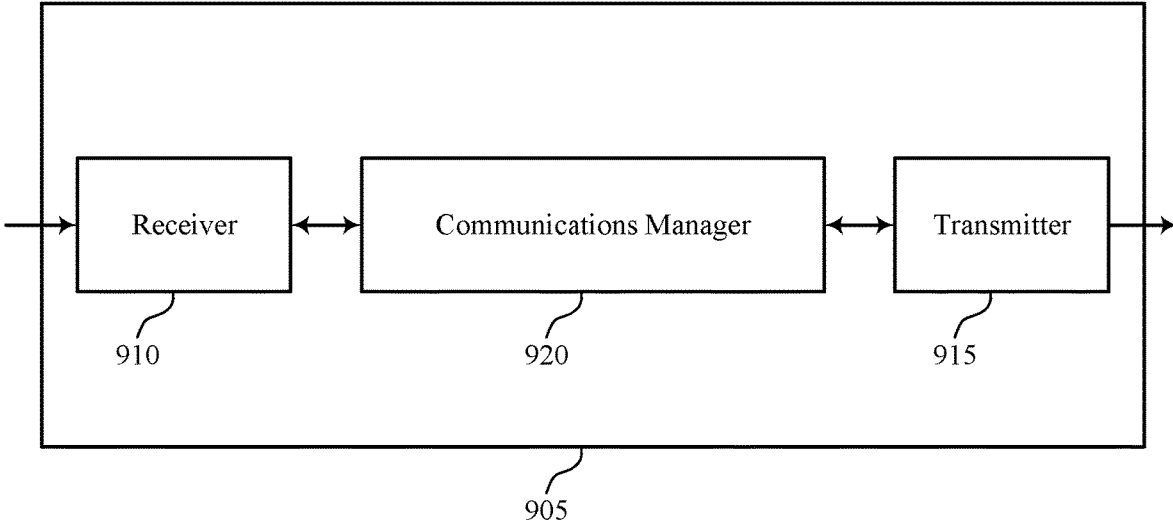
FIGS. 9 and 10 show block diagrams of devices that support control signaling for repeaters with energy transfer in accordance with one or more aspects of the present disclosure.

FIG. 9 shows a block diagram 900 of a device 905 that supports control signaling for repeaters with energy transfer in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of control signaling for repeaters with energy transfer as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. For example, the communications manager 920 may be configured as or otherwise support a means for transmitting control signaling including an indication of one or more configurations for relaying signals associated with a set of multiple signal types between one or more transmitting nodes and one or more receiving nodes, where the set of multiple signal types includes at least a first signal type associated with an information communications signal and a second signal type associated with an energy signal. The communications manager 920 may be configured as or otherwise support a means for communicating with a wireless node based on the one or more configurations.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for relaying energy transfer signals which may result in reduced processing, reduced power consumption, and more efficient utilization of communication resources, among other advantages.

Figure 10:
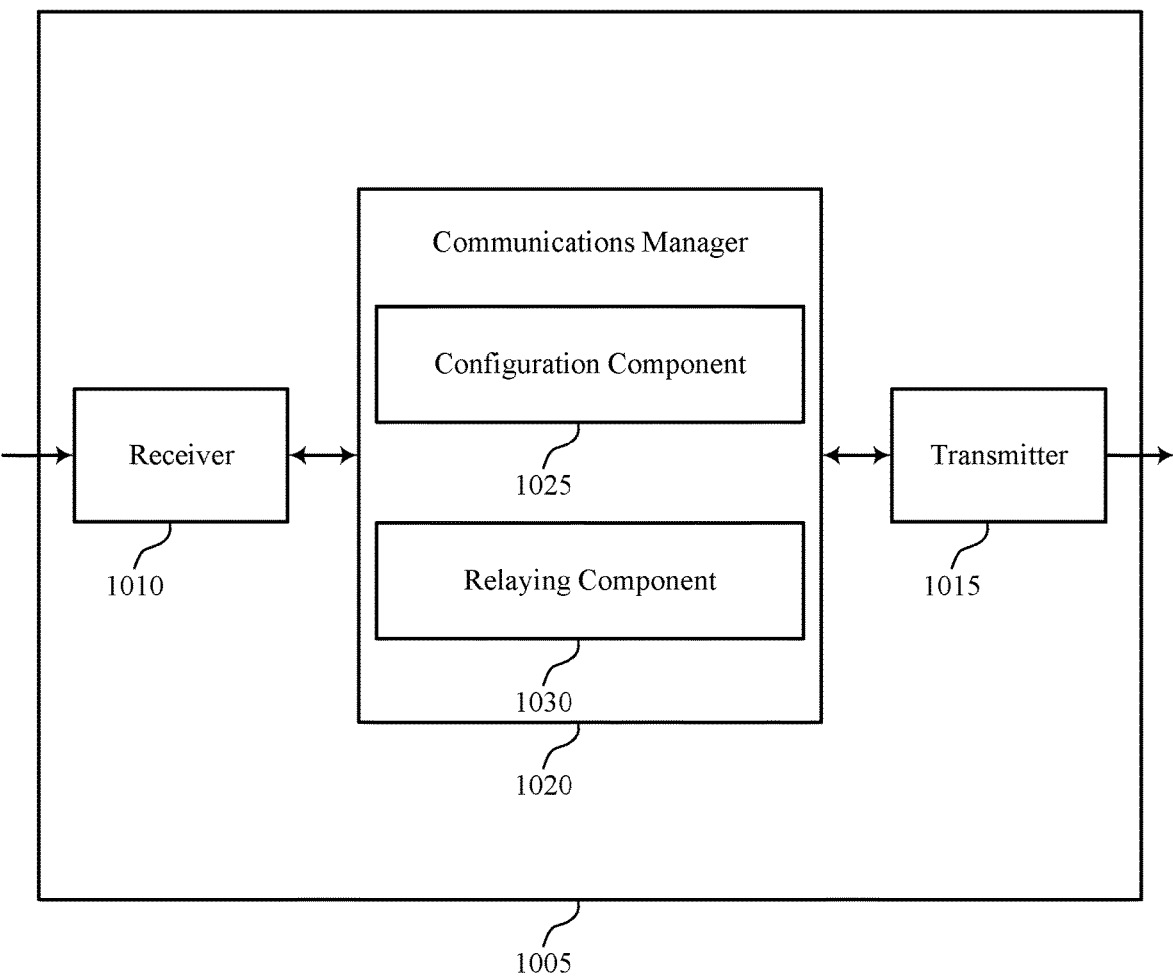

FIG. 10 shows a block diagram 1000 of a device 1005 that supports control signaling for repeaters with energy transfer in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of control signaling for repeaters with energy transfer as described herein. For example, the communications manager 1020 may include a configuration component 1025 a relaying component 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. The configuration component 1025 may be configured as or otherwise support a means for transmitting control signaling including an indication of one or more configurations for relaying signals associated with a set of multiple signal types between one or more transmitting nodes and one or more receiving nodes, where the set of multiple signal types includes at least a first signal type associated with an information communications signal and a second signal type associated with an energy signal. The relaying component 1030 may be configured as or otherwise support a means for communicating with a wireless node based on the one or more configurations.

Figure 11:
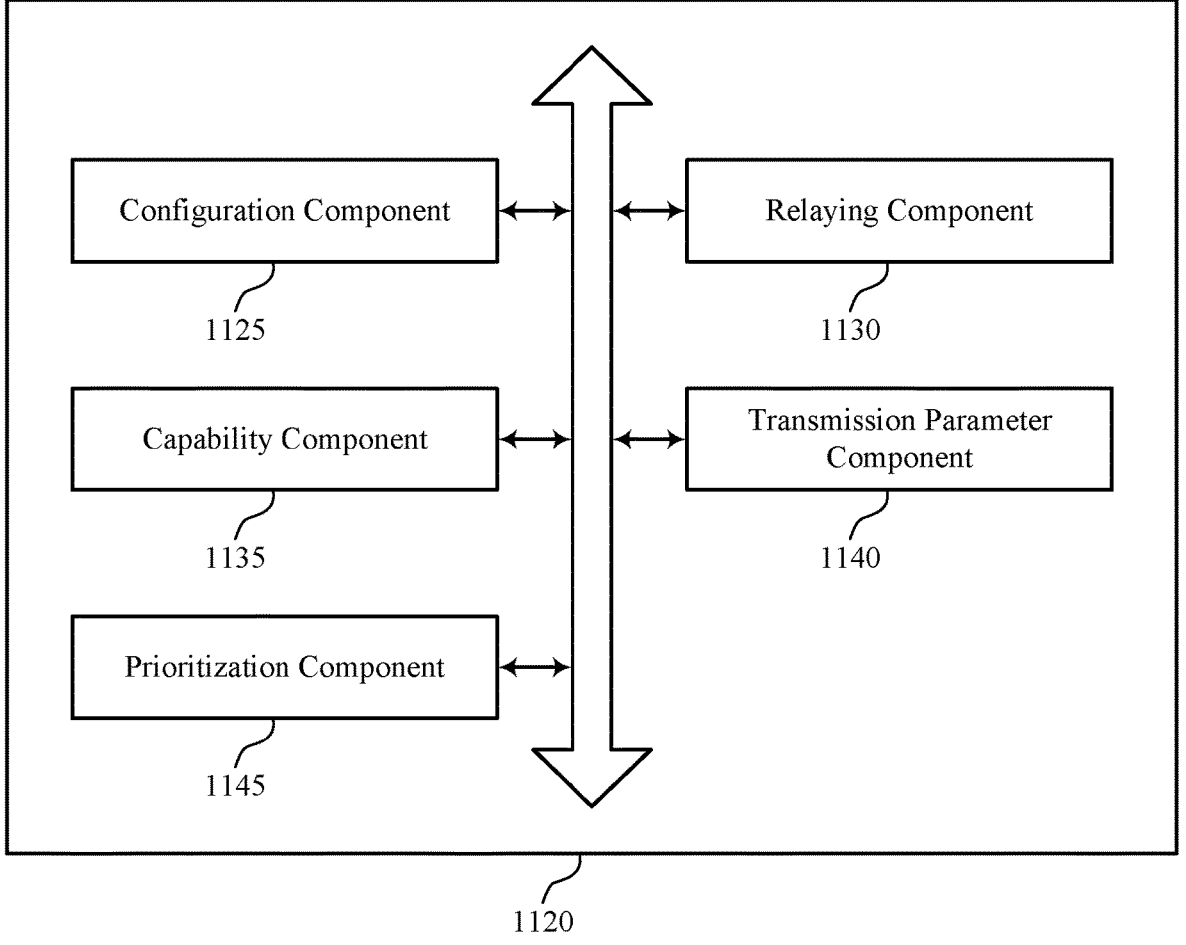
FIG. 11 shows a block diagram of a communications manager that supports control signaling for repeaters with energy transfer in accordance with one or more aspects of the present disclosure.

FIG. 11 shows a block diagram 1100 of a communications manager 1120 that supports control signaling for repeaters with energy transfer in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of control signaling for repeaters with energy transfer as described herein. For example, the communications manager 1120 may include a configuration component 1125, a relaying component 1130, a capability component 1135, a transmission parameter component 1140, a prioritization component 1145, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a network entity in accordance with examples as disclosed herein. The configuration component 1125 may be configured as or otherwise support a means for transmitting control signaling including an indication of one or more configurations for relaying signals associated with a set of multiple signal types between one or more transmitting nodes and one or more receiving nodes, where the set of multiple signal types includes at least a first signal type associated with an information communications signal and a second signal type associated with an energy signal. The relaying component 1130 may be configured as or otherwise support a means for communicating with a wireless node based on the one or more configurations.

In some examples, the capability component 1135 may be configured as or otherwise support a means for receiving a capability message indicating a capability of the wireless node to support relaying of energy transfer signaling, where the one or more configurations are based on the capability message.

In some examples, to support transmitting the control signaling, the transmission parameter component 1140 may be configured as or otherwise support a means for transmitting an indication of one or more transmission parameters for relaying the signals associated with the set of multiple signal types.

In some examples, to support transmitting the indication of the one or more transmission parameters, the transmission parameter component 1140 may be configured as or otherwise support a means for transmitting an indication of one or more beam indices, where the one or more beam indices includes at least a first beam index associated with the first signal type and a second beam index associated with the second signal type, and where the one or more transmission parameters includes the one or more beam indices.

In some examples, to support transmitting the indication of the one or more transmission parameters, the transmission parameter component 1140 may be configured as or otherwise support a means for transmitting an indication of one or more transmit powers, where the one or more transmit powers includes at least a first transmit power associated with the first signal type and a second transmit power associated with the second signal type and where the one or more transmission parameters includes the one or more transmit powers.

In some examples, to support transmitting the indication of the one or more transmission parameters, the transmission parameter component 1140 may be configured as or otherwise support a means for transmitting an indication of one or more sets of time and frequency resources, where the one or more sets of time and frequency resources includes at least a first set of time and frequency resources associated with the first signal type and a second set of time and frequency resources associated with the second signal type, and where the one or more transmission parameters include the one or more sets of time and frequency resources.

In some examples, the one or more configurations indicate a frequency division multiplexing configuration for transmitting the set of multiple signal types. In some examples, a starting and length indicator value associated with the first set of time and frequency resources is based on a starting and length indicator value associated with the second set of time and frequency resources.

In some examples, the one or more configurations indicate a time division multiplexing configuration for transmitting the set of multiple signal types. In some examples, a duration between the first set of time and frequency resources and the second set of time and frequency resources satisfies a threshold duration and. In some examples, the threshold duration is based on a beam switching capability of the wireless node.

In some examples, to support transmitting the indication of the one or more transmission parameters, the prioritization component 1145 may be configured as or otherwise support a means for transmitting a set of priority values associated with the set of multiple signal types, where the set of priority values includes at least a first priority value associated with the first signal type and a second priority value associated with the second signal type and where the one or more transmission parameters includes the set of priority values.

In some examples, to support transmitting the indication of the one or more configurations, the prioritization component 1145 may be configured as or otherwise support a means for transmitting an indication of one or more transmit power priority rules associated with the set of priority values, where the one or more configurations includes the one or more transmit power priority rules.

In some examples, a first transmit power priority rule of the one or more transmit power priority rules indicates for the wireless node to reduce a transmission power of one or more signals of a signal type associated with a lowest priority value out of the set of priority values associated with the set of multiple signal types.

In some examples, a first transmit power priority rule of the one or more transmit power priority rules indicates for the wireless node to reduce a transmission power of each signal of a set of signals. In some examples, priority values associated each signal type of the set of signals are equal.

In some examples, to support receiving the indication of the one or more configurations, the prioritization component 1145 may be configured as or otherwise support a means for transmitting an indication of a transmission priority rule associated with the set of priority values, where the transmission priority rule indicates for the wireless node to drop one or more signals of a signal type associated with a lowest priority value out of the set of priority values associated with the set of multiple signal types, and where the one or more configurations includes the transmission priority rule.

In some examples, the first signal type further includes a first information communications signal associated with wireless communications between the network entity and a UE and a second information communications signal associated with backscatter modulated information signaling from a passively powered device.

Figure 12:
FIG. 12 shows a diagram of a system including a device that supports control signaling for repeaters with energy transfer in accordance with one or more aspects of the present disclosure.

FIG. 12 shows a diagram of a system 1200 including a device 1205 that supports control signaling for repeaters with energy transfer in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting control signaling for repeaters with energy transfer). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a network entity in accordance with examples as disclosed herein. For example, the communications manager 1220 may be configured as or otherwise support a means for transmitting control signaling including an indication of one or more configurations for relaying signals associated with a set of multiple signal types between one or more transmitting nodes and one or more receiving nodes, where the set of multiple signal types includes at least a first signal type associated with an information communications signal and a second signal type associated with an energy signal. The communications manager 1220 may be configured as or otherwise support a means for communicating with a wireless node based on the one or more configurations.

By including or configuring the communications manager 1220 in accordance with examples as described herein, the device 1205 may support techniques for relaying energy transfer signals which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of control signaling for repeaters with energy transfer as described herein, or the processor 1235 and the memory 1225 may be otherwise configured to perform or support such operations.

FIG. 13 shows a flowchart illustrating a method 1300 that supports control signaling for repeaters with energy transfer in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving control signaling including an indication of one or more configurations for relaying signals associated with a set of multiple signal types between one or more transmitting nodes and one or more receiving nodes, where the set of multiple signal types includes at least a first signal type associated with an information communications signal and a second signal type associated with an energy transfer signal. The operations of 1305 may be performed in accordance with examples as disclosed herein. In some examples, aspects of the operations of 1305 may be performed by a configuration component 725 as described with reference to FIG. 7.

At 1310, the method may include receiving one or more signals of the first signal type, of the second signal type, or both. The operations of 1310 may be performed in accordance with examples as disclosed herein. In some examples, aspects of the operations of 1310 may be performed by a relaying component 730 as described with reference to FIG. 7.

At 1315, the method may include relaying at least a subset of the one or more signals of the first signal type, of the second signal type, or both, according to the one or more configurations. The operations of 1315 may be performed in accordance with examples as disclosed herein. In some examples, aspects of the operations of 1315 may be performed by a relaying component 730 as described with reference to FIG. 7.

FIG. 14 shows a flowchart illustrating a method 1400 that supports control signaling for repeaters with energy transfer in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include transmitting a capability message indicating a capability of the wireless node to support relaying of energy transfer signaling, where the one or more configurations are based on the capability message. The operations of 1405 may be performed in accordance with examples as disclosed herein. In some examples, aspects of the operations of 1405 may be performed by a capability component 735 as described with reference to FIG. 7.

At 1410, the method may include receiving control signaling including an indication of one or more configurations for relaying signals associated with a set of multiple signal types between one or more transmitting nodes and one or more receiving nodes, where the set of multiple signal types includes at least a first signal type associated with an information communications signal and a second signal type associated with an energy transfer signal. The operations of 1410 may be performed in accordance with examples as disclosed herein. In some examples, aspects of the operations of 1410 may be performed by a configuration component 725 as described with reference to FIG. 7.

At 1415, the method may include receiving one or more signals of the first signal type, of the second signal type, or both. The operations of 1415 may be performed in accordance with examples as disclosed herein. In some examples, aspects of the operations of 1415 may be performed by a relaying component 730 as described with reference to FIG. 7.

At 1420, the method may include relaying at least a subset of the one or more signals of the first signal type, of the second signal type, or both, according to the one or more configurations. The operations of 1420 may be performed in accordance with examples as disclosed herein. In some examples, aspects of the operations of 1420 may be performed by a relaying component 730 as described with reference to FIG. 7.

FIG. 15 shows a flowchart illustrating a method 1500 that supports control signaling for repeaters with energy transfer in accordance with one or more aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include transmitting control signaling including an indication of one or more configurations for relaying signals associated with a set of multiple signal types between one or more transmitting nodes and one or more receiving nodes, where the set of multiple signal types includes at least a first signal type associated with an information communications signal and a second signal type associated with an energy signal. The operations of 1505 may be performed in accordance with examples as disclosed herein. In some examples, aspects of the operations of 1505 may be performed by a configuration component 1125 as described with reference to FIG. 11.

At 1510, the method may include communicating with a wireless node based on the one or more configurations. The operations of 1510 may be performed in accordance with examples as disclosed herein. In some examples, aspects of the operations of 1510 may be performed by a relaying component 1130 as described with reference to FIG. 11.

FIG. 16 shows a flowchart illustrating a method 1600 that supports control signaling for repeaters with energy transfer in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include receiving a capability message indicating a capability of the wireless node to support relaying of energy transfer signaling, where the one or more configurations are based on the capability message. The operations of 1605 may be performed in accordance with examples as disclosed herein. In some examples, aspects of the operations of 1605 may be performed by a capability component 1135 as described with reference to FIG. 11.

At 1610, the method may include transmitting control signaling including an indication of one or more configurations for relaying signals associated with a set of multiple signal types between one or more transmitting nodes and one or more receiving nodes, where the set of multiple signal types includes at least a first signal type associated with an information communications signal and a second signal type associated with an energy signal. The operations of 1610 may be performed in accordance with examples as disclosed herein. In some examples, aspects of the operations of 1610 may be performed by a configuration component 1125 as described with reference to FIG. 11.

At 1615, the method may include communicating with a wireless node based on the one or more configurations. The operations of 1615 may be performed in accordance with examples as disclosed herein. In some examples, aspects of the operations of 1615 may be performed by a relaying component 1130 as described with reference to FIG. 11.

The following provides an overview of aspects of the present disclosure:

Aspect 1: A method for wireless communications at a wireless node, comprising: receiving control signaling comprising an indication of one or more configurations for relaying signals associated with a plurality of signal types between one or more transmitting nodes and one or more receiving nodes, wherein the plurality of signal types comprises at least a first signal type associated with an information communications signal and a second signal type associated with an energy transfer signal; receiving one or more signals of the first signal type, of the second signal type, or both; and relaying at least a subset of the one or more signals of the first signal type, of the second signal type, or both, according to the one or more configurations.

Aspect 2: The method of aspect 1, further comprising: transmitting a capability message indicating a capability of the wireless node to support relaying of energy transfer signaling, wherein the one or more configurations are based at least in part on the capability message.

Aspect 3: The method of any of aspects 1 through 2, wherein receiving the control signaling comprises: receiving an indication of one or more transmission parameters for relaying the at least the subset of the one or more signals of the first signal type, of the second signal type, or both.

Aspect 4: The method of aspect 3, wherein receiving the indication of the one or more transmission parameters comprises: receiving an indication of one or more beam indices, wherein the one or more beam indices comprise at least a first beam index associated with the first signal type and a second beam index associated with the second signal type, and wherein the one or more transmission parameters comprises the one or more beam indices.

Aspect 5: The method of any of aspects 3 through 4, wherein receiving the indication of the one or more transmission parameters comprises: receiving an indication of one or more transmit powers, wherein the one or more transmit powers comprises at least a first transmit power associated with the first signal type and a second transmit power associated with the second signal type, and wherein the one or more transmission parameters comprise the one or more transmit powers.

Aspect 6: The method of any of aspects 3 through 5, wherein receiving the indication of the one or more transmission parameters comprises: receiving an indication of one or more sets of time and frequency resources, wherein the one or more sets of time and frequency resources comprises at least a first set of time and frequency resources associated with the first signal type and a second set of time and frequency resources associated with the second signal type, and wherein the one or more transmission parameters comprise the one or more sets of time and frequency resources.

Aspect 7: The method of aspect 6, wherein the one or more configurations indicate a frequency division multiplexing configuration for transmitting the plurality of signal types, and a starting and length indicator value associated with the first set of time and frequency resources is based at least in part on a starting and length indicator value associated with the second set of time and frequency resources.

Aspect 8: The method of any of aspects 6 through 7, wherein the one or more configurations indicate a time division multiplexing configuration for transmitting the plurality of signal types, and a duration between the first set of time and frequency resources and the second set of time and frequency resources satisfies a threshold duration, and the threshold duration is based at least in part on a beam switching capability of the wireless node.

Aspect 9: The method of any of aspects 3 through 8, wherein receiving the indication of the one or more transmission parameters comprises: receiving a set of priority values associated with the plurality of signal types, wherein the set of priority values comprises at least a first priority value associated with the first signal type and a second priority value associated with the second signal type, and wherein the one or more transmission parameters comprises the set of priority values.

Aspect 10: The method of aspect 9, wherein receiving the indication of the one or more configurations comprises: receiving an indication of one or more transmit power priority rules associated with the set of priority values, wherein the one or more configurations comprises the one or more transmit power priority rules.

Aspect 11: The method of aspect 10, wherein a first transmit power priority rule of the one or more transmit power priority rules indicates for the wireless node to reduce a transmission power of one or more signals of a signal type associated with a lowest priority value out of the set of priority values associated with the plurality of signal types.

Aspect 12: The method of aspect 10, wherein a first transmit power priority rule of the one or more transmit power priority rules indicates for the wireless node to reduce a transmission power of each signal of a set of signals, priority values associated each signal type of the set of signals are equal.

Aspect 13: The method of any of aspects 9 through 12, wherein receiving the indication of the one or more configurations comprises: receiving an indication of a transmission priority rule associated with the set of priority values, wherein the transmission priority rule indicates for the wireless node to drop one or more signals of a signal type associated with a lowest priority value out of the set of priority values associated with the plurality of signal types, and wherein the one or more configurations comprises the transmission priority rule.

Aspect 14: The method of any of aspects 1 through 13, wherein the first signal type further comprises a first information communications signal associated with wireless communications between a network entity and a UE and a second information communications signal associated with backscatter modulated information signaling from a passively powered device.

Aspect 15: A method for wireless communications at a network entity, comprising: transmitting control signaling comprising an indication of one or more configurations for relaying signals associated with a plurality of signal types between one or more transmitting nodes and one or more receiving nodes, wherein the plurality of signal types comprises at least a first signal type associated with an information communications signal and a second signal type associated with an energy signal; and communicating with a wireless node based at least in part on the one or more configurations.

Aspect 16: The method of aspect 15, further comprising: receiving a capability message indicating a capability of the wireless node to support relaying of energy transfer signaling, wherein the one or more configurations are based at least in part on the capability message.

Aspect 17: The method of any of aspects 15 through 16, wherein transmitting the control signaling comprises: transmitting an indication of one or more transmission parameters for relaying the signals associated with the plurality of signal types.

Aspect 18: The method of aspect 17, wherein transmitting the indication of the one or more transmission parameters comprises: transmitting an indication of one or more beam indices, wherein the one or more beam indices comprises at least a first beam index associated with the first signal type and a second beam index associated with the second signal type, and wherein the one or more transmission parameters comprises the one or more beam indices.

Aspect 19: The method of any of aspects 17 through 18, wherein transmitting the indication of the one or more transmission parameters comprises: transmitting an indication of one or more transmit powers, wherein the one or more transmit powers comprises at least a first transmit power associated with the first signal type and a second transmit power associated with the second signal type and wherein the one or more transmission parameters comprises the one or more transmit powers.

Aspect 20: The method of any of aspects 17 through 19, wherein transmitting the indication of the one or more transmission parameters comprises: transmitting an indication of one or more sets of time and frequency resources, wherein the one or more sets of time and frequency resources comprises at least a first set of time and frequency resources associated with the first signal type and a second set of time and frequency resources associated with the second signal type, and wherein the one or more transmission parameters comprise the one or more sets of time and frequency resources.

Aspect 21: The method of aspect 20, wherein the one or more configurations indicate a frequency division multiplexing configuration for transmitting the plurality of signal types, and a starting and length indicator value associated with the first set of time and frequency resources is based at least in part on a starting and length indicator value associated with the second set of time and frequency resources.

Aspect 22: The method of any of aspects 20 through 21, wherein the one or more configurations indicate a time division multiplexing configuration for transmitting the plurality of signal types, and a duration between the first set of time and frequency resources and the second set of time and frequency resources satisfies a threshold duration and the threshold duration is based at least in part on a beam switching capability of the wireless node.

Aspect 23: The method of any of aspects 17 through 22, wherein transmitting the indication of the one or more transmission parameters comprises: transmitting a set of priority values associated with the plurality of signal types, wherein the set of priority values comprises at least a first priority value associated with the first signal type and a second priority value associated with the second signal type and wherein the one or more transmission parameters comprises the set of priority values.

Aspect 24: The method of aspect 23, wherein transmitting the indication of the one or more configurations comprises: transmitting an indication of one or more transmit power priority rules associated with the set of priority values, wherein the one or more configurations comprises the one or more transmit power priority rules.

Aspect 25: The method of aspect 24, wherein a first transmit power priority rule of the one or more transmit power priority rules indicates for the wireless node to reduce a transmission power of one or more signals of a signal type associated with a lowest priority value out of the set of priority values associated with the plurality of signal types.

Aspect 26: The method of aspect 24, wherein a first transmit power priority rule of the one or more transmit power priority rules indicates for the wireless node to reduce a transmission power of each signal of a set of signals, priority values associated each signal type of the set of signals are equal.

Aspect 27: The method of any of aspects 23 through 26, wherein receiving the indication of the one or more configurations comprises: transmitting an indication of a transmission priority rule associated with the set of priority values, wherein the transmission priority rule indicates for the wireless node to drop one or more signals of a signal type associated with a lowest priority value out of the set of priority values associated with the plurality of signal types, and wherein the one or more configurations comprises the transmission priority rule.

Aspect 28: The method of any of aspects 15 through 27, wherein the first signal type further comprises a first information communications signal associated with wireless communications between the network entity and a UE and a second information communications signal associated with backscatter modulated information signaling from a passively powered device.

Aspect 29: An apparatus for wireless communications at a wireless node, comprising a processor; memory coupled with the processor; and instructions stored in the memory and executable by the processor to cause the apparatus to perform a method of any of aspects 1 through 14.

Aspect 30: An apparatus for wireless communications at a wireless node, comprising at least one means for performing a method of any of aspects 1 through 14.

Aspect 31: A non-transitory computer-readable medium storing code for wireless communications at a wireless node, the code comprising instructions executable by a processor to perform a method of any of aspects 1 through 14.

Aspect 32: An apparatus for wireless communications at a network entity, comprising a processor; memory coupled with the processor; and instructions stored in the memory and executable by the processor to cause the apparatus to perform a method of any of aspects 15 through 28.

Aspect 33: An apparatus for wireless communications at a network entity, comprising at least one means for performing a method of any of aspects 15 through 28.

Aspect 34: A non-transitory computer-readable medium storing code for wireless communications at a network entity, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a wireless node, comprising:

transmitting a capability message indicating a capability of the wireless node to support relaying of energy transfer signaling;

receiving control signaling, from a network entity, comprising an indication of one or more configurations for relaying signals associated with a plurality of signal types between one or more transmitting nodes and one or more receiving nodes, wherein the plurality of signal types comprises at least a first signal type associated with an information-bearing signal and a second signal type associated with an energy transfer signal, wherein the one or more configurations are based at least in part on the capability message;

receiving one or more signals of the first signal type, of the second signal type, or both; and relaying at least a subset of the one or more signals of the first signal type, of the second signal type, or both, according to the one or more configurations.

2. The method of claim 1, wherein receiving the control signaling comprises:

receiving an indication of one or more transmission parameters for relaying the at least the subset of the one or more signals of the first signal type, of the second signal type, or both.

3. The method of claim 2, wherein receiving the indication of the one or more transmission parameters comprises:

receiving an indication of one or more beam indices, wherein the one or more beam indices comprise at least a first beam index associated with the first signal type and a second beam index associated with the second signal type, and wherein the one or more transmission parameters comprises the one or more beam indices.

4. The method of claim 2, wherein receiving the indication of the one or more transmission parameters comprises:

receiving an indication of one or more transmit powers, wherein the one or more transmit powers comprises at least a first transmit power associated with the first signal type and a second transmit power associated with the second signal type, and wherein the one or more transmission parameters comprise the one or more transmit powers.

5. The method of claim 2, wherein receiving the indication of the one or more transmission parameters comprises:

receiving an indication of one or more sets of time and frequency resources, wherein the one or more sets of time and frequency resources comprises at least a first set of time and frequency resources associated with the first signal type and a second set of time and frequency resources associated with the second signal type, and wherein the one or more transmission parameters comprise the one or more sets of time and frequency resources.

6. The method of claim 5, wherein the one or more configurations indicate a frequency division multiplexing configuration for transmitting the plurality of signal types, and wherein a starting and length indicator value associated with the first set of time and frequency resources is based at least in part on a starting and length indicator value associated with the second set of time and frequency resources.

7. The method of claim 5, wherein the one or more configurations indicate a time division multiplexing configuration for transmitting the plurality of signal types, and wherein a duration between the first set of time and frequency resources and the second set of time and frequency resources satisfies a threshold duration, and wherein the threshold duration is based at least in part on a beam switching capability of the wireless node.

8. The method of claim 2, wherein receiving the indication of the one or more transmission parameters comprises:

receiving a set of priority values associated with the plurality of signal types, wherein the set of priority values comprises at least a first priority value associated with the first signal type and a second priority value associated with the second signal type, and wherein the one or more transmission parameters comprises the set of priority values.

9. The method of claim 8, wherein receiving the indication of the one or more configurations comprises:

receiving an indication of one or more transmit power priority rules associated with the set of priority values, wherein the one or more configurations comprises the one or more transmit power priority rules.

10. The method of claim 9, wherein a first transmit power priority rule of the one or more transmit power priority rules indicates for the wireless node to reduce a transmission power of one or more signals of a signal type associated with a lowest priority value out of the set of priority values associated with the plurality of signal types.

11. The method of claim 9, wherein a first transmit power priority rule of the one or more transmit power priority rules indicates for the wireless node to reduce a transmission power of each signal of a set of signals, wherein priority values associated each signal type of the set of signals are equal.

12. The method of claim 8, wherein receiving the indication of the one or more configurations comprises:

receiving an indication of a transmission priority rule associated with the set of priority values, wherein the transmission priority rule indicates for the wireless node to drop one or more signals of a signal type associated with a lowest priority value out of the set of priority values associated with the plurality of signal types, and wherein the one or more configurations comprises the transmission priority rule.

13. The method of claim 1, wherein the first signal type further comprises a first signal associated with wireless communications between the network entity and a user equipment (UE) and a second signal associated with back-scatter modulated information signaling from a passively powered device.

14. An apparatus for wireless communications at a wireless node, comprising:

one or more processors;

one or more memories coupled with the one or more processors; and instructions stored in the one or more memories and executable by the one or more processors to cause the apparatus to:

transmit a capability message indicating a capability of the wireless node to support relaying of energy transfer signaling;

receive control signaling, from a network entity, comprising an indication of one or more configurations for relaying signals associated with a plurality of signal types between one or more transmitting nodes and one or more receiving nodes, wherein the plurality of signal types comprises at least a first signal type associated with an information-bearing signal and a second signal type associated with an energy transfer signal, wherein the one or more configurations are based at least in part on the capability message;

receive one or more signals of the first signal type, of the second signal type, or both; and relay at least a subset of the one or more signals of the first signal type, of the second signal type, or both, according to the one or more configurations.

15. The apparatus of claim 14, wherein, to receive the control signaling, the instructions are executable by the one or more processors to cause the apparatus to:

receive an indication of one or more transmission parameters for relaying the at least the subset of the one or more signals of the first signal type, of the second signal type, or both.

16. The apparatus of claim 15, wherein, to receive the indication of the one or more transmission parameters, the instructions are executable by the one or more processors to cause the apparatus to:

receive an indication of one or more beam indices, wherein the one or more beam indices comprise at least a first beam index associated with the first signal type and a second beam index associated with the second signal type, and wherein the one or more transmission parameters comprises the one or more beam indices.

17. The apparatus of claim 15, wherein, to receive the indication of the one or more transmission parameters, the instructions are executable by the one or more processors to cause the apparatus to:

receive an indication of one or more transmit powers, wherein the one or more transmit powers comprises at least a first transmit power associated with the first signal type and a second transmit power associated with the second signal type, and wherein the one or more transmission parameters comprise the one or more transmit powers.

18. The apparatus of claim 15, wherein, to receive the indication of the one or more transmission parameters, the instructions are executable by the one or more processors to cause the apparatus to:

receive an indication of one or more sets of time and frequency resources, wherein the one or more sets of time and frequency resources comprises at least a first set of time and frequency resources associated with the first signal type and a second set of time and frequency resources associated with the second signal type, and wherein the one or more transmission parameters comprise the one or more sets of time and frequency resources.

19. The apparatus of claim 18, wherein the one or more configurations indicate a frequency division multiplexing configuration for transmitting the plurality of signal types, and wherein a starting and length indicator value associated with the first set of time and frequency resources is based at least in part on a starting and length indicator value associated with the second set of time and frequency resources.

20. The apparatus of claim 18, wherein the one or more configurations indicate a time division multiplexing configuration for transmitting the plurality of signal types, and wherein a duration between the first set of time and frequency resources and the second set of time and frequency resources satisfies a threshold duration, and wherein the threshold duration is based at least in part on a beam switching capability of the wireless node.

21. The apparatus of claim 15, wherein, to receive the indication of the one or more transmission parameters, the instructions are executable by the one or more processors to cause the apparatus to:

receive a set of priority values associated with the plurality of signal types, wherein the set of priority values comprises at least a first priority value associated with the first signal type and a second priority value associated with the second signal type, and wherein the one or more transmission parameters comprises the set of priority values.

22. The apparatus of claim 21, wherein, to receive the indication of the one or more configurations, the instructions are executable by the one or more processors to cause the apparatus to:

receive an indication of one or more transmit power priority rules associated with the set of priority values, wherein the one or more configurations comprises the one or more transmit power priority rules.

23. The apparatus of claim 22, wherein a first transmit power priority rule of the one or more transmit power priority rules indicates for the wireless node to reduce a transmission power of one or more signals of a signal type associated with a lowest priority value out of the set of priority values associated with the plurality of signal types.

24. The apparatus of claim 22, wherein a first transmit power priority rule of the one or more transmit power priority rules indicates for the wireless node to reduce a transmission power of each signal of a set of signals, wherein priority values associated each signal type of the set of signals are equal.

25. The apparatus of claim 21, wherein, to receive the indication of the one or more configurations, the instructions are executable by the one or more processors to cause the apparatus to:

receive an indication of a transmission priority rule associated with the set of priority values, wherein the transmission priority rule indicates for the wireless node to drop one or more signals of a signal type associated with a lowest priority value out of the set of priority values associated with the plurality of signal types, and wherein the one or more configurations comprises the transmission priority rule.

26. The apparatus of claim 14, wherein the first signal type further comprises a first signal associated with wireless communications between the network entity and a user equipment (UE) and a second signal associated with backscatter modulated information signaling from a passively powered device.

27. A wireless node for wireless communications, comprising:

means for transmitting a capability message indicating a capability of the wireless node to support relaying of energy transfer signaling;

means for receiving control signaling, from a network entity, comprising an indication of one or more configurations for relaying signals associated with a plurality of signal types between one or more transmitting nodes and one or more receiving nodes, wherein the plurality of signal types comprises at least a first signal type associated with an information-bearing signal and a second signal type associated with an energy transfer signal, wherein the one or more configurations are based at least in part on the capability message;

means for receiving one or more signals of the first signal type, of the second signal type, or both; and means for relaying at least a subset of the one or more signals of the first signal type, of the second signal type, or both, according to the one or more configurations.

28. The wireless node of claim 27, wherein the means for receiving the control signaling comprises:

means for receiving an indication of one or more transmission parameters for relaying the at least the subset of the one or more signals of the first signal type, of the second signal type, or both.

29. A non-transitory computer-readable medium storing code for wireless communications, the code comprising instructions executable by one or more processors to:

transmit a capability message indicating a capability of the wireless node to support relaying of energy transfer signaling;

receive control signaling, from a network entity, comprising an indication of one or more configurations for relaying signals associated with a plurality of signal types between one or more transmitting nodes and one or more receiving nodes, wherein the plurality of signal types comprises at least a first signal type associated with an information-bearing signal and a second signal type associated with an energy transfer signal, wherein the one or more configurations are based at least in part on the capability message;

receive one or more signals of the first signal type, of the second signal type, or both; and relay at least a subset of the one or more signals of the first signal type, of the second signal type, or both, according to the one or more configurations.

30. The non-transitory computer-readable medium of claim 29, wherein, to receive the control signaling, the code comprising the instructions executable by the one or more processors to:

receive an indication of one or more transmission parameters for relaying the at least the subset of the one or more signals of the first signal type, of the second signal type, or both.

* * * * *